(12) United States Patent
Kremen

(10) Patent No.: US 7,532,372 B2
(45) Date of Patent: May 12, 2009

(54) METHOD FOR CREATING A HOLOGRAPHIC SCREEN THAT RECONSTRUCTS UNIFORMLY MAGNIFIED THREE-DIMENSIONAL IMAGES FROM PROJECTED INTEGRAL PHOTOGRAPHS

(76) Inventor: Stanley H. Kremen, 4 Lenape La., East Brunswick, NJ (US) 08816

(*) Notice: Subject to any disclaimer, the term of this patent is extended or adjusted under 35 U.S.C. 154(b) by 907 days.

(21) Appl. No.: 10/904,917

(22) Filed: Dec. 5, 2004

(65) Prior Publication Data
US 2005/0088714 A1 Apr. 28, 2005

Related U.S. Application Data

(63) Continuation-in-part of application No. 09/853,790, filed on May 11, 2001, now abandoned, which is a continuation-in-part of application No. 09/749,984, filed on Dec. 27, 2000, now Pat. No. 6,593,958, which is a continuation of application No. 09/111,990, filed on Jul. 8, 1998, now Pat. No. 6,229,562.

(60) Provisional application No. 60/051,972, filed on Jul. 8, 1997.

(51) Int. Cl.
*G02B 5/32* (2006.01)

(52) U.S. Cl. .................................. 359/19; 359/900
(58) Field of Classification Search ................ 359/15, 359/19, 20, 25, 26, 900; 430/1, 2
See application file for complete search history.

(56) References Cited

U.S. PATENT DOCUMENTS

| 3,807,829 A | * | 4/1974 | Close ........................... 359/19 |
| 4,703,994 A | * | 11/1987 | Leib et al. ..................... 359/19 |
| 5,734,485 A | * | 3/1998 | Buchkremer et al. .......... 359/25 |

* cited by examiner

*Primary Examiner*—Alessandro Amari

(57) ABSTRACT

A method of producing a holographic screen for reconstruction of uniformly magnified three-dimensional images from projected integral photographs. The screen is produced as an array of holographic imaging elements whose center distances and focal lengths have been scaled-up uniformly by the magnification factor. In the preferred embodiment, when illuminated with a white light reference beam, the screen reconstructs a linear array comprising an alternating series of red, green, and blue vertical lines. However, when an enlarged integral photograph representative of a three-dimensional scene is correctly projected onto the screen, a uniformly magnified three-dimensional image of that scene is reconstructed. The screen may be manufactured as rectangular tiles that are assembled to form the entire screen.

18 Claims, 21 Drawing Sheets

(a)

(b)

(c)

METHOD FOR CREATING A HOLOGRAPHIC SCREEN THAT RECONSTRUCTS UNIFORMLY MAGNIFIED THREE-DIMENSIONAL IMAGES FROM PROJECTED INTEGRAL PHOTOGRAPHS

CROSS REFERENCE TO RELATED APPLICATIONS

This non-provisional patent application is a continuation-in-part of U.S. patent application Ser. No. 09/853,790, filed May 11, 2001 and currently pending, which in turn is a continuation-in-part of U.S. Non-Provisional patent application Ser. No. 09/749,984, filed Dec. 27, 2000 (having matured into U.S. Pat. No. 6,593,958 which issued on Jul. 15, 2003), which in turn is a continuation of U.S. patent Non-Provisional application Ser. No. 09/111,990, filed Jul. 8, 1998 (having matured into U.S. Pat. No. 6,229,562 which issued on May 8, 2001), which in turn is the non-provisional counterpart of U.S. Provisional Patent Application No. 60/051,972, filed Jul. 8, 1977. The above mentioned U.S. patents and applications will be hereinafter called the Claimed Priority Patents and Applications. This application claims priority to all the above mentioned Claimed Priority Patents and Applications. All of the above mentioned Claimed Priority Patents and Applications are incorporated by reference herein in their entirety thereto.

In addition, attention is called to U.S. Non-Provisional patent application Ser. No. 10/904,745, filed on Dec. 2, 2004, and U.S. Non-Provisional patent application Ser. No. 10/904,745, filed on Nov. 24, 2004, both applications being continuations of U.S. Non-Provisional patent application Ser. No. 10/293,137, filed on Jun. 18, 2003, which in turn is also a continuation of U.S. patent application Ser. No. 09/749,984, filed on Dec. 27, 2000. Also, attention is called to U.S. Non-Provisional patent application Ser. No. 10/416,689, filed on Oct. 16, 2004, being the U.S. National Stage Entry of PCT/US02/14789, filed on May 10, 2002. Finally, attention is called to U.S. Provisional Patent Application No. 60/481,823, filed on Dec. 21, 2003. These U.S. patent applications will be hereinafter referred to as the Reference Patents and Applications, and are incorporated by reference herein in their entirety thereto.

BACKGROUND OF THE INVENTION

The invention described therein derives from the principles of holography and/or integral photography. The Claimed Priority Patents and Applications disclose a basic principle of magnification and projection. This principle permits magnification and projection of 3-dimensional images uniformly in all directions, thereby overcoming drawbacks in the prior art. Based upon this principle, cameras are described, in their various embodiments, that photograph a scene and retain the 3-dimensional information therein. An editor is also described that would edit integral photographs and holograms containing the 3-dimensional information from the photographed scene. In addition, a theater is designed to project the magnified 3-dimensional scene that was photographed, upon a large screen to be viewed by an audience. Further, the projectors and screens are described in their various embodiments.

Within some of the embodiments of the camera and projector, specially prepared holograms are used as optical elements therein. Use of these holograms affords the advantage of being able to replace complex, bulky, difficult to manufacture, and expensive conventional optical elements needed to produce certain types of images during photography, magnification, and projection. In addition, some of the embodiments of the screen are themselves holograms. Unlike conventional projection screens used in current theaters, the screen described in the Parent Application is an active optical element that, when combined with the projection optics, causes light waves to emanate from the screen into the theater that are the same as though the 3-dimensional scene were real. Therefore, the viewing audience should not be able to perform any visual test to determine whether or not the projected 3-dimensional scene truly exists. The use of a specially developed holographic screen affords the advantage of replacing more conventional optical components used in screen fabrication.

In view of the above, it is therefore an object of the invention to provide methods of preparing the holographic screen.

SUMMARY OF THE INVENTION

The Present Invention discloses a method for creating a holographic screen that reconstructs uniformly magnified three-dimensional images from projected integral photographs. An integral photograph is prepared using an input imaging array comprising a plurality of imaging elements. The holographic screen is also an imaging array comprising a plurality of holographic imaging elements. The screen array and the input imaging array have the same number of imaging elements and have a geometrically similar arrangement of the elements. The screen array is scaled-up in terms of the separation distances between the imaging elements and the focal lengths of the imaging elements in that these properties of the input array are multiplied, respectively, by a magnification factor to yield these properties of the screen. The integral photograph is projected onto the screen being uniformly enlarged by the magnification factor, and the centers of the elemental pictures of the projected integral photograph are aligned with the centers of the imaging elements of the screen.

BRIEF DESCRIPTION OF THE DRAWINGS

The invention will be better understood by the Detailed Description of the Preferred and Alternate Embodiments with reference to the drawings, in which.

DEFINITION OF TERMS USED IN THE PRESENT APPLICATION

Figure 1:
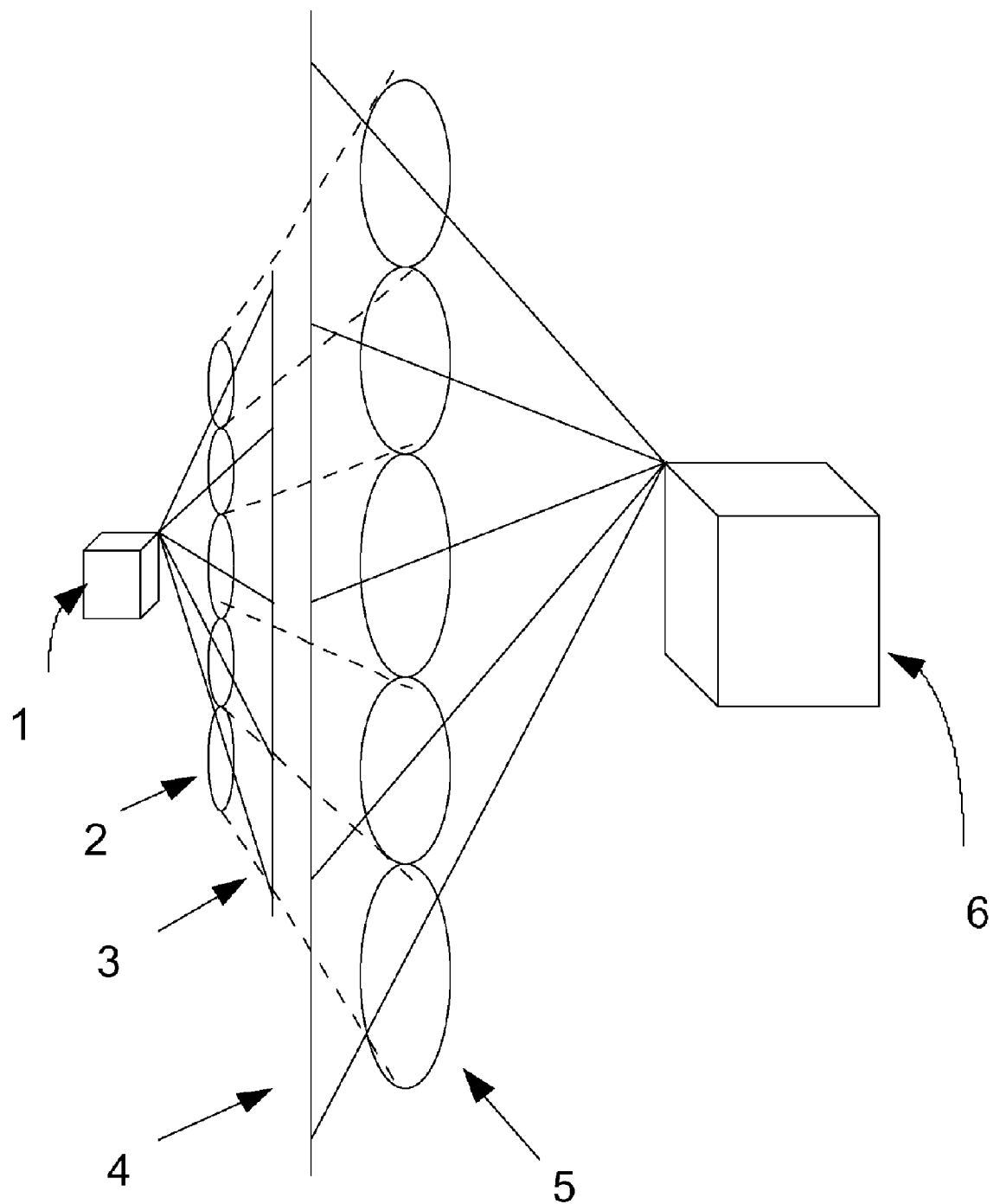
FIG. 1 illustrates the method of magnification that is the basis for both this application and the Parent Application.

Within the Present Application, the Applicant intends to use his own definitions of many special terms. Insofar as these special terms are used herein, the definitions provided below supersede the plain and ordinary meanings of the words. The definitions follow:

ELEMENTAL IMAGE—a single two-dimensional image of a scene as observed from a single viewpoint and which plainly shows that scene.

EVERSION or EVERTING (or TO EVERT)—a process that transforms a pseudoscopic three-dimensional image into an orthoscopic three-dimensional image.

GEOMETRICALLY SIMILAR IN ARRANGEMENT—two arrays of imaging elements or of elemental images are similar if the ratio of separation distances between the imaging elements or elemental images of both arrays is a constant.

IMAGE PLANE—(for an integral frame) is the surface (prefereably planar) where the elemental images appear to be in focus.

IMAGING ARRAY—an arrangement of a coordinated collection of imaging elements each capable of producing an in-focus elemental image from electromagnetic radiation (preferably light rays), thereby forming an integral frame. This term is synonymous with MATRIX LENS ARRAY.

IMAGING ELEMENT—that part of a matrix lens array which is capable of producing a single in-focus elemental image of an integral frame from electromagnetic radiation (preferably light rays).

IMAGING RATIO—(for an imaging array) is the ratio of the focal distances to the distances between the centers of the imaging elements.

INTEGRAL FRAME—a two-dimensional arrangement of a coordinated collection of elemental images from a single scene.

INTEGRAL PHOTOGRAPH—a two-dimensional photograph or drawing of an INTEGRAL FRAME.

MAGNIFICATION FACTOR—the ratio of essential dimensions of that which is magnified or enlarged to those of that which is unmagnified or not enlarged.

MATRIX LENS ARRAY—This term is synonymous with IMAGING ARRAY.

PROJECTING (PROJECTION)—causing electromagnetic radiation (or light rays) to travel from one location to another.

SCENE—an object or collection of objects positioned in space. A scene is two-dimensional if all object points lie in a single plane that is perpendicular to the line of sight. Otherwise, it is three-dimensional.

SEPARATION DISTANCE—The distance between the centers of two elemental images of an integral frame.

UNIFORM ENLARGEMENT—(for a two-dimensional image) is essentially equal magnification in all planar (or surface) dimensions.

UNIFORM MAGNIFICATION—(for a three-dimensional image) is essentially equal magnification in all spatial dimensions.

DETAILED DESCRIPTION OF THE PREFERRED AND ALTERNATE EMBODIMENTS

The present invention, in all its embodiments, is based upon a method that permits magnification of a 3-dimensional image produced from a photograph, hologram, optical system or other system or device, regardless of the medium or the method, in such manner as to preserve the depth to height and width relationship of the image as it existed prior to magnification. This method requires the 3-dimensional image prior to magnification to be rendered as an array of 2-dimensional images by some form of imaging array or matrix lens array, such as a fly's eye lens. Were this array of 2-dimensional images to be magnified by some magnification factor, and then viewed or projected through a new matrix lens array that has been scaled up from the lens array that produced the original array of 2-dimensional images, such that the scaling factor is equal to the magnification (i.e., the focal length and the distances between the centers of the lenslets must be multiplied by the same magnification factor), a new 3-dimensional image would be produced that would be magnified by the same magnification factor, and all image dimensions would be magnified by the same factor such that all dimensions of the final 3-dimensional image would be proportional to the dimensions of the original image. (For purposes of scaling, the distances from the central plane passing through the lens array to the image plane may be substituted for the focal lengths as an equivalent. However, this calculation substitution must be made for both arrays.) The utility of magnifying 3-dimensional images using this method would be the ability to enlarge holograms or integral photographs or other media from which 3-dimensional images are produced, or to project still or moving 3-dimensional images before a large audience.

The magnification principle is illustrated in FIG. 1. Object 1 is photographed by matrix lens array 2, thereby producing integral photograph 3. Integral photograph 3 is then enlarged to give integral photograph 4 which is then placed behind matrix lens array 5. This combination yields magnified image 6. It must be noted here, that during scaling-up, the ratio of the focal distances (or distances from the central plane to the image plane) to the distances between the centers of the lenslets remains constant. This ratio of focal distances to center distances will be referred to as the imaging ratio. This is analogous to the (F/#)'s of the lenslets remaining constant where adjacent lenslets are touching.

Figure 2:
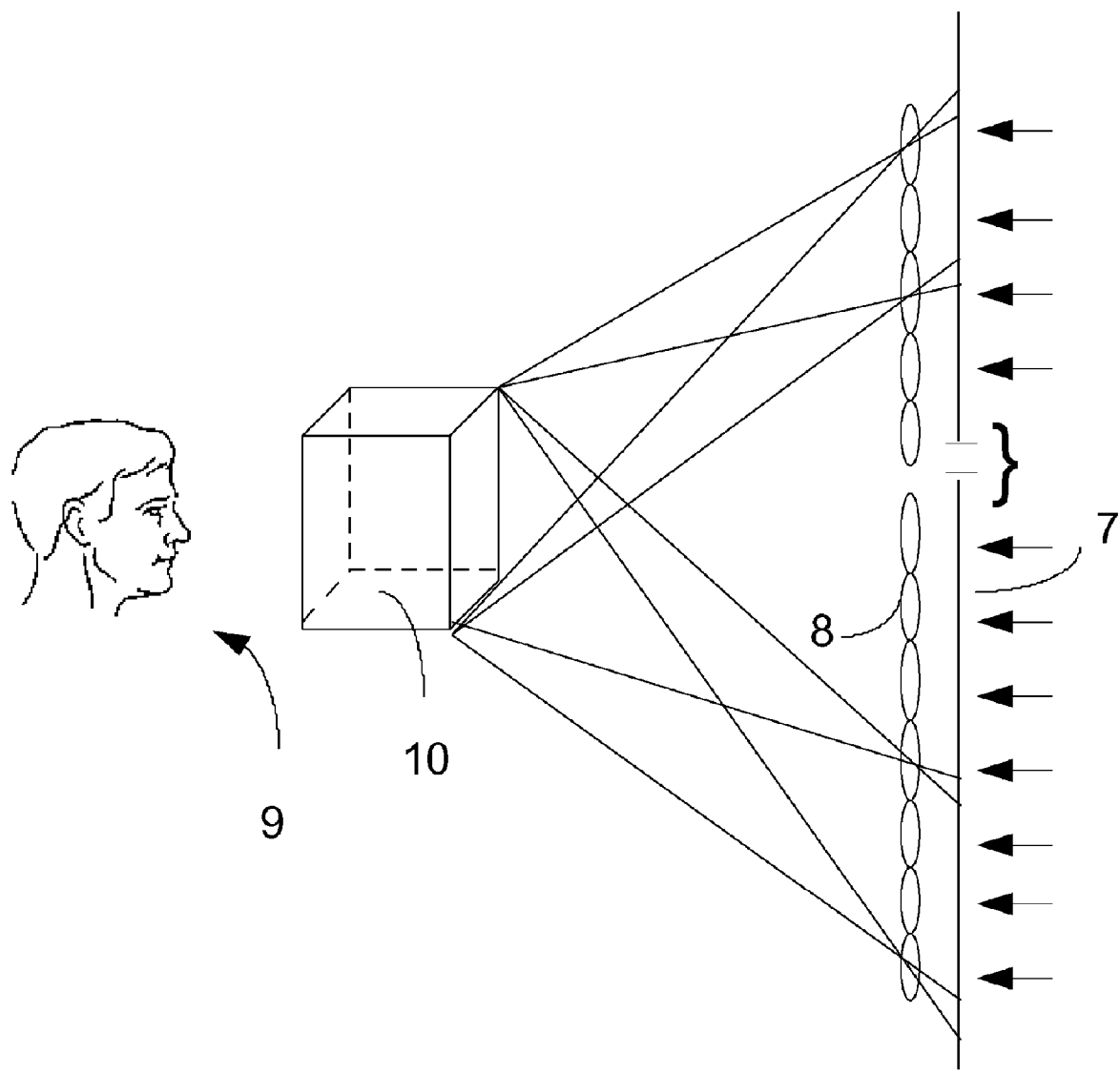
FIG. 2 illustrates how a magnified image can be projected before an audience.

Projection is merely another form of magnification. The only difference lies in the fact that no permanent record is produced as in photography. To illustrate the principle of projection, let us use as an example, the technique of rear projection shown in FIG. 2. (As will be seen later, it is also possible to illustrate this principle with front projection.) Were an integral photographic transparency to be projected at some given magnification onto a translucent screen 7 which is behind a large matrix lens array 8, an observer 9 in the audience sitting in front of the matrix lens array will see the magnified 3-dimensional image 10. The 3-dimensional image can be made orthoscopic, and can be made to appear either in front of or behind the matrix lens array.

The camera consists of an optical system that would produce the 2-dimensional array of 2-dimensional images on a plane, the plane and/or recording medium whereon the 2-dimensional array is produced, the mechanical apparatus (if any) associated with the image plane and/or recording medium, a means (if any) for adjusting the optical system for focus and/or special effects, and the housing (if any) that integrates the optical system, the mechanical system and the image plane and/or recording medium into a single unit. An example of the optical system is a matrix lens array such as a fly's eye lens arranged so as to produce an integral frame that is a rectangular matrix array of rectangular 2-dimensional images. The image plane, for example, would contain a film for recording the 2-dimensional images. Once developed, the integral frame or matrix array photograph would be called an integral photograph. If the camera is a motion picture camera capable of capturing moving 3-dimensional images in the form of a sequential series of integral photographs, a film motion and film stabilization mechanism would be required. Finally, such a camera might require a housing to integrate the components and to provide a dark environment so as to not expose the film unnecessarily.

The projector consists of an optical system that would project a magnified image of the processed 2-dimensional integral photograph produced by the camera onto an image plane that would be converted by the screen into a magnified 3-dimensional image, the mechanical apparatus (if any) associated with the image plane and/or recording medium, a means (if any) for adjusting the optical system for focus and/or special effects, and the housing (if any) that integrates the optical system, the mechanical system and the image plane and/or recording medium into a single unit. If the projector is a motion picture projector capable of magnifying moving 3-dimensional images in the form of a sequential series of integral photographs, a film motion and film stabilization mechanism would be required. Finally, such a projector might require a housing to integrate the components and a projection lamp.

The screen consists of an active optical system configured as an imaging array comprised of a plurality of optical elements. The screen has the same number of active optical elements as the imaging array used in the camera and configured identically as in the camera. In the preferred embodiment of the system, the imaging array of the screen is larger than that of the camera such that the ratio of the center distances between the imaging elements of the screen to the center distances between the imaging elements of the camera is equal to the image magnification. However, the imaging ratio of the imaging elements in the screen must be equal to the imaging ratio of the imaging elements in the camera imaging array. Finally, the screen might consist of a mechanism to filter the color of certain portions of the projected image in order to produce a color rendition of a scene projected upon it in black-and-white.

Figure 3:
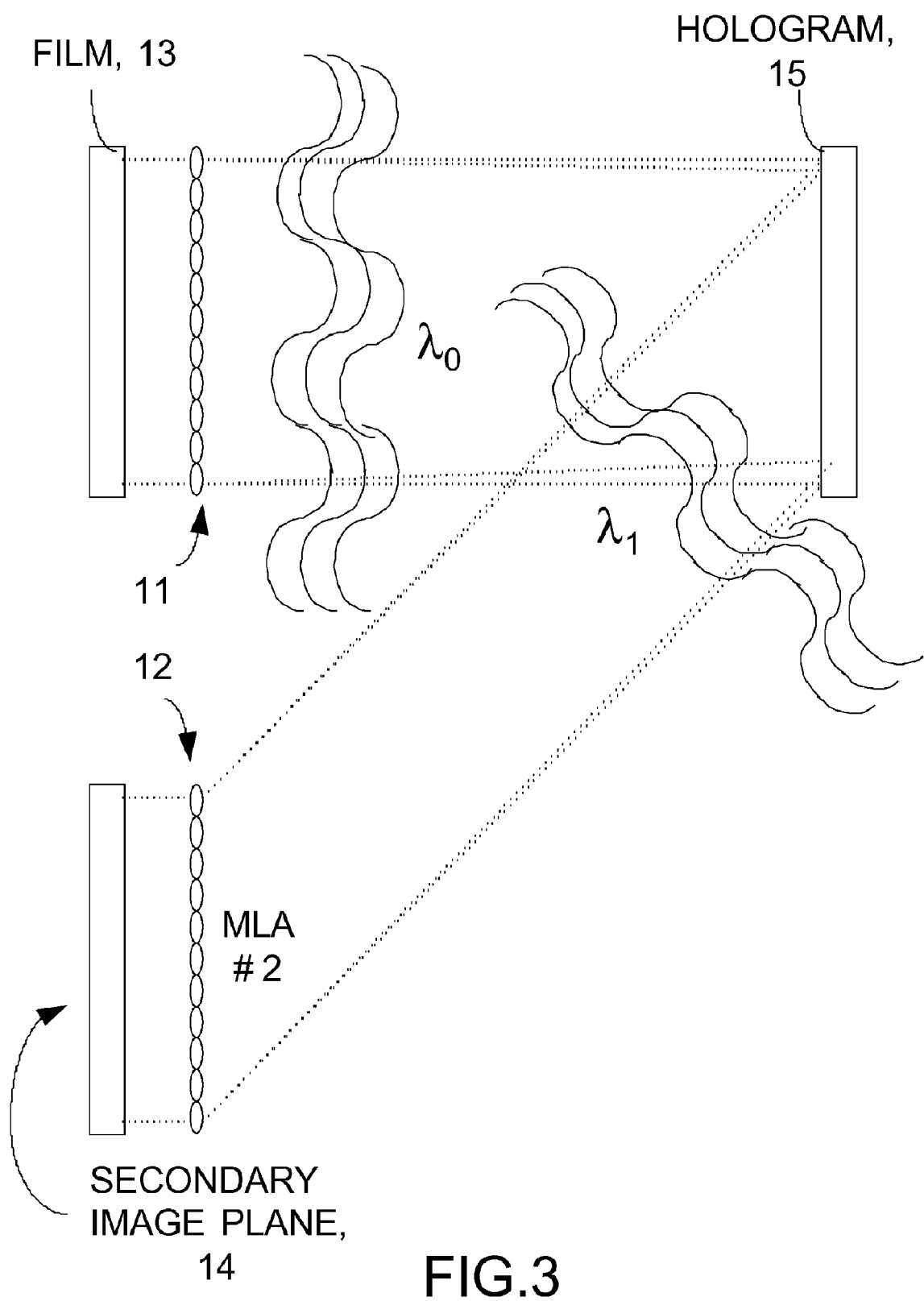
FIG. 3 is a schematic of primary holographic projection using two matrix lens arrays.

The Claimed Priority Patents and Applications describe a number of methods for projecting the photographed scene residing on a 2-dimensional integral photograph or hologram onto a large screen thereby creating a magnified 3-dimensional image of the scene. Many of these utilize complex systems comprised of conventional optics. Conventional optical systems such as those described in the Claimed Priority Patents and Applications are expensive to manufacture, and the images produced therefrom are subject to aberration and distortion. By contrast, holographic imaging devices are inexpensive to manufacture, and images produced from them are generally aberration and distortion free. One method of accomplishing projection using a holographic imaging device is shown in FIG. 3. This is the preferred embodiment of the projection system. In this case, instead of using expensive projection lenses, two matrix lens arrays, 11 and 12, are used as shown. On the secondary image plane 14, the image is magnified by the desired amount, and the ratio of the size of the elements of matrix lens array 12 to matrix lens array 11 is equal to the magnification. The hologram is prepared as follows. In the setup shown in FIG. 3, replace both the film 13 and the secondary image plane 14 by two diffuser plates. Between the film plane diffuser plate and matrix lens array 11, place a movable aperture which is the size of one element on the film frame 13, and between the secondary image plane and matrix lens array 12, place a similar movable aperture which is the size of a magnified element on the secondary image plane 14. A high resolution photographic plate is positioned in the hologram plane 15. The film plane aperture is placed in front of the first elemental position and the secondary image plane aperture is placed in the corresponding first elemental position. Both diffuser plates, 13 and 14, are then trans-illuminated by an appropriate laser for a sufficient time to expose the hologram 15. (This may have to be done for each element by exposing it with many bursts of low intensity laser radiation.) Both apertures are then moved to the second elemental positions and the hologram is exposed again; and so-on for every elemental position. Another method of preparing the same hologram is to also place an appropriate elemental aperture in front of the hologram plane 15. This elemental aperture moves to a different position in front of the hologram plane every time the other two apertures move. The addition of this third aperture will avoid reciprocity problems with the photographic emulsion. (Reciprocity problems will also be avoided by the short-burst method mentioned above. The advantage of the short-burst method over the third aperture method is that crosstalk between elements is avoided.) This method of projection using holographic imaging seems to be the most practical embodiment of the projection principle.

Figure 4:
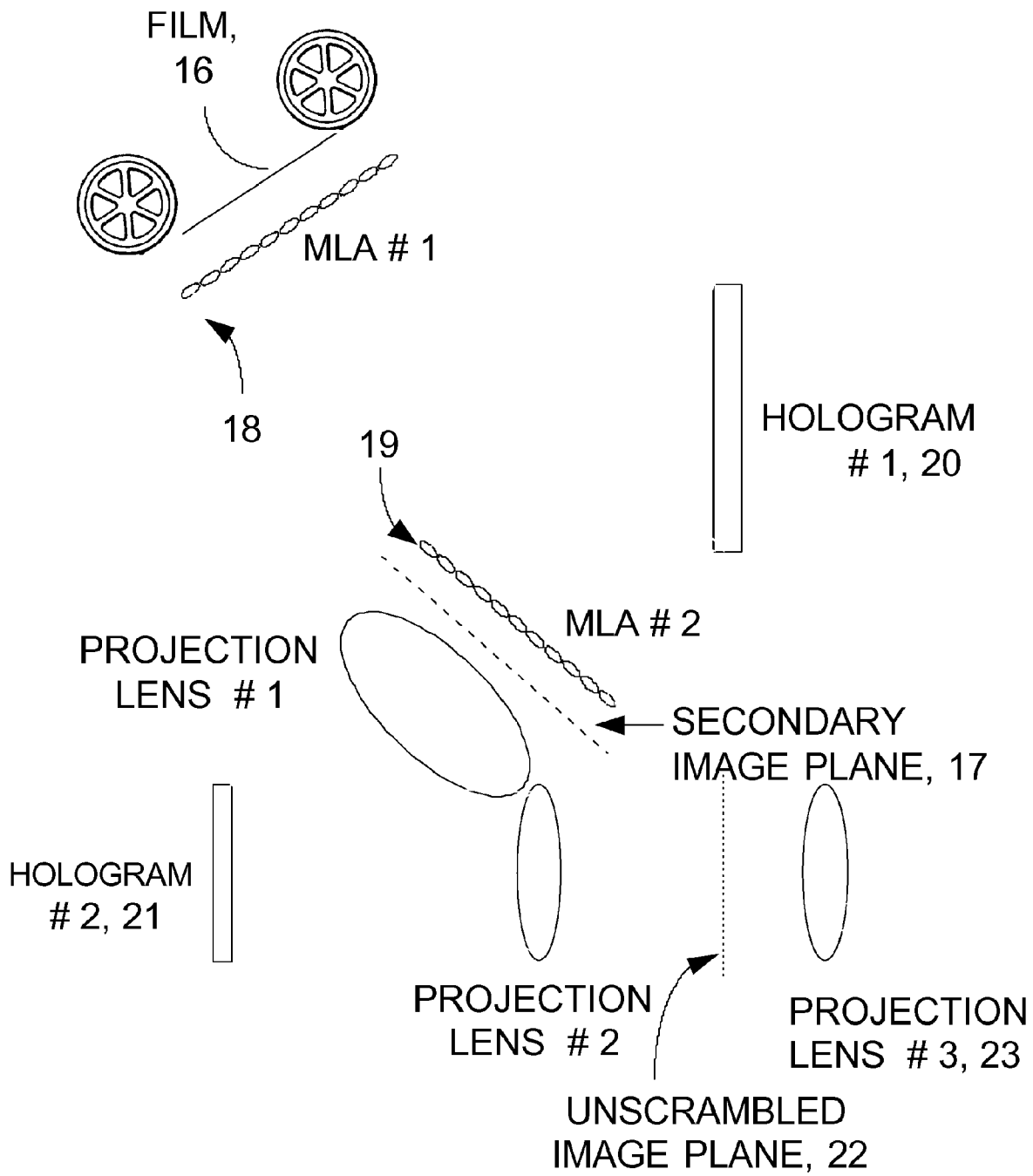
FIG. 4 is a schematic showing the optics of the preferred embodiment of the holographic projector.

Holographic imaging devices can be used with more-or-less standard, inexpensive lenses to accomplish all projection functions. FIG. 4 shows the final schematic configuration of this type of projector. This represents the preferred embodiment of the optics of the holographic projector. The image on the film 16 is first magnified onto a secondary image plane 17 holographically using two matrix lens arrays, 18 and 19, and the first hologram 20. This magnified image is then used as the reference beam for the second hologram 21 so as to reconstruct a magnified, unmultiplexed, inverted image on the unscrambled image plane 22. This unscrambled image plane can either be an intermediate plane or the screen itself. In the configuration shown, it is an intermediate plane, and a position adjustable projection lens 23 is used to project the image formed at this plane onto the screen. No diffuser plates are needed at the intermediate image planes (although they can be used if necessity dictates), and their use is undesirable since they add greatly to the required illumination levels. The first and second holograms, 20 and 21, are shown in the figure as volume or reflection holograms. Transmission holograms can also be used, but the efficiency of transmission holograms is less than reflection holograms. Therefore, using transmission holograms would also add to the required illumination levels. The only non-holographic optical elements in the projector are either simple projection lenses or matrix lens arrays. Therefore, the holographic projector represents a far simpler system than the projector using more conventional optics.

Figure 5:
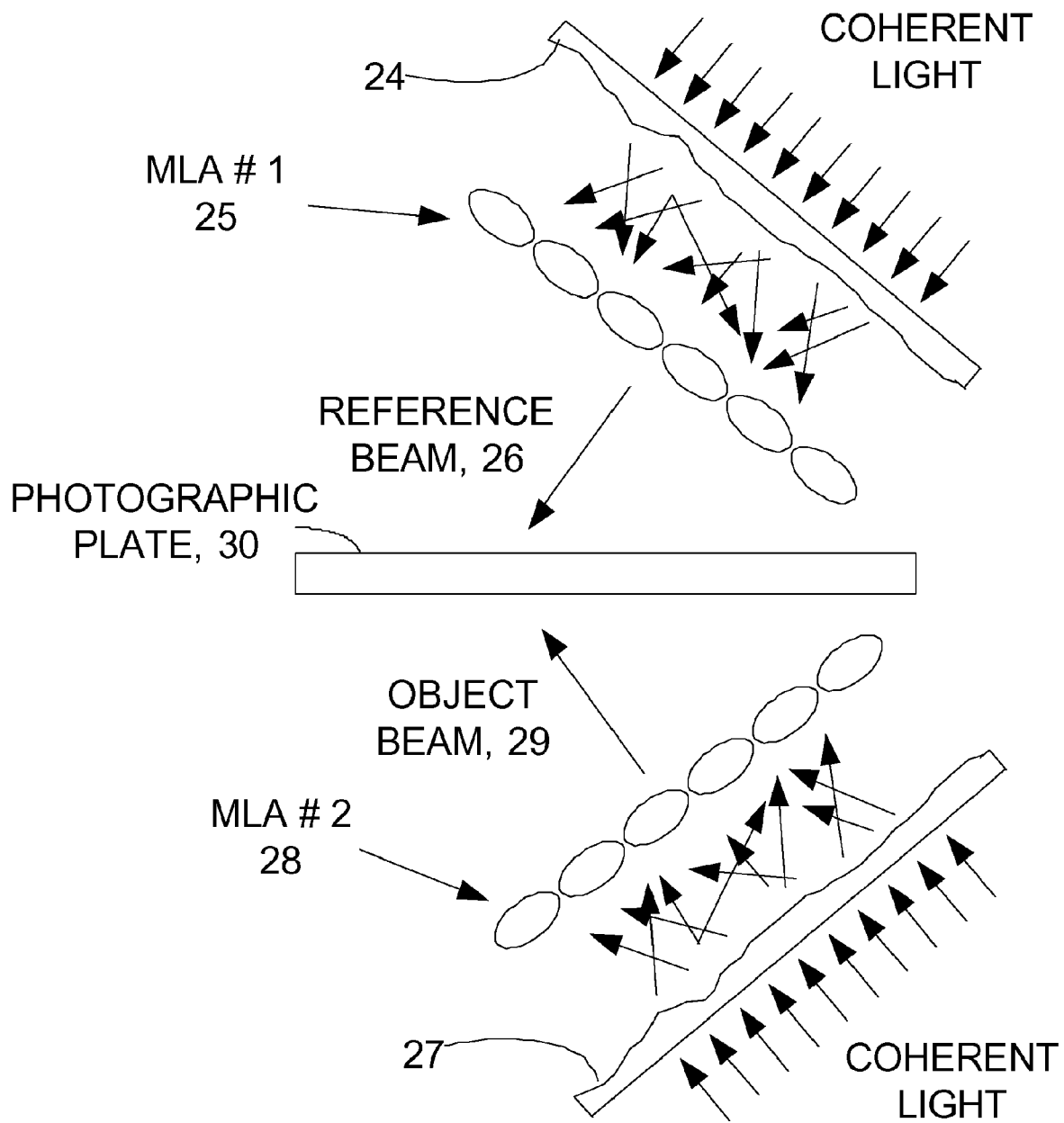
FIG. 5 illustrates how HOLOGRAM #1 in FIG. 4 can be prepared.

FIG. 5 illustrates how the first hologram 20 in FIG. 4 can be produced. Two active optical systems are used to produce the reference and object beams necessary to expose the photographic plate to produce the reflection hologram. The first active optical system is comprised of a diffuser plate 24 and the first matrix lens array 25. When illuminated by coherent light, the diffuser plate 24 scatters the light which is still coherent, and the scattered light impinges upon the matrix lens array 25 which, in turn, produces the reference beam 26. The second active optical system is comprised of a diffuser plate 27 and the second matrix lens array 28. When illuminated by coherent light coming from the same source as that which illuminated the first active optical system, the diffuser plate 27 scatters the light which is still coherent, and the scattered light impinges upon the matrix lens array 28 which, in turn produces the object beam 29. The reference beam 26 and the object beam 29 impinge upon opposite sides of the unexposed transparent photographic plate 30. This photographic plate, when developed and processed, becomes the first hologram 20 of FIG. 4. It should be noted that, with a hologram of this type, it is possible, and it might be desirable to eliminate the second matrix lens array 19 from the projection optics of FIG. 4, while producing the same result.

FIG. 3 shows an optical system consisting of more than one hologram. Holograms can be used as imaging devices in the camera as well as in the projector. One of the tasks of holographic optical systems is to perform multiplexing and unmultiplexing. Multiplexing is the process of optically compressing the elemental images of an integral photograph and then scrambling their relative positions so as to enable them to fit into a small space on the image plane. In a camera, the image plane would normally contain photographic film, but the medium could be something else such as image orthocon tubes. Unmultiplexing is the reverse process of expansion and unscrambling the images from the multiplexed image plane and projecting it onto a second image plane so that the image becomes a readable integral photograph. Multiplexing must be performed by the camera while unmultiplexing must be performed by the projector.

Another task that can be performed by a holographic optical system is the eversion of the final 3-dimensional image from pseudoscopy to orthoscopy. A viewing audience expects to see an orthoscopic 3-dimensional image of a scene. Orthoscopy occurs normally where a first object that is supposed to be in front of a second object appears closer to the viewer. Pseudoscopy occurs where the second object appears closer to the viewer. This is an unnatural viewing condition that would be annoying to an audience. Unfortunately, the image produced using the basic principle of magnification and projection is pseudoscopic. Therefore, optics must be used to evert from pseudoscopy to orthoscopy.

Figure 6:
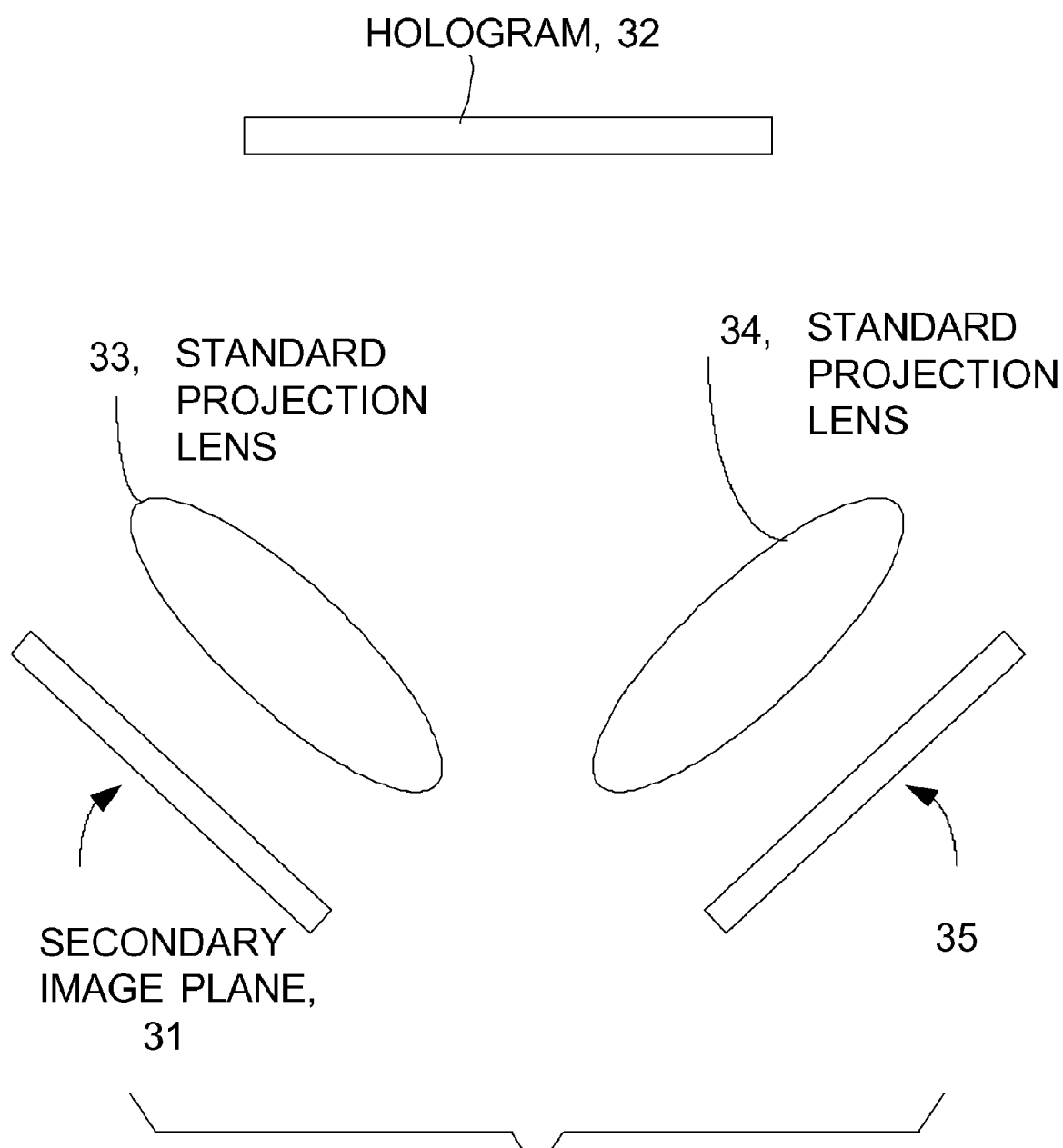
FIG. 6 illustrates how HOLOGRAM #2 in FIG. 4 can be prepared.

In the Claimed Priority Patents and Applications, the most practical method and the preferred embodiment of unmultiplexing is with the use of a holographic imaging device. Not only can the entire image unmultiplexing process be accomplished in one step using such an element, but so also can both the eversion of the image from pseudoscopy to orthoscopy and the final projection (if these steps are desired to be performed using this method). The use of this method is shown in FIG. 6. The magnified image from the secondary image plane 31 is projected onto a specially prepared hologram 32, using a standard projection lens 33. The hologram is so designed that when illuminated with such a reference beam, it will generate an object beam which when projected through a second projection lens 34, will image onto another plane a picture having the vertical rows arranged side-by-side horizontally 35. The hologram used here is similar to the second hologram, 21, in FIG. 4. (It is highly desirable to replace the projection lenses by two matrix lens arrays as is shown in FIG. 3. This is also illustrated as the first hologram, 20, in FIG. 4.) The method to fabricate such a hologram can be illustrated using FIG. 6. Replace the secondary and unscrambled image planes (31 and 35 respectively) by diffusing screens. Apertures must be used with both reference and object beams so as to direct the location, size and shape of each corresponding row between the secondary and unscrambled image planes. This holographic imaging device is then fabricated by the same method as that which is shown in FIG. 5 as previously described. (This is not to say that the holographic imaging device described here is the same as previously described and illustrated in FIG. 5, but only that it is fabricated in a similar manner.) Similarly, as with the previous holographic imaging device, an aperture could be used with the photographic plate to solve the problem of emulsion reciprocity, or the short-burst method can be used.

Figure 7:
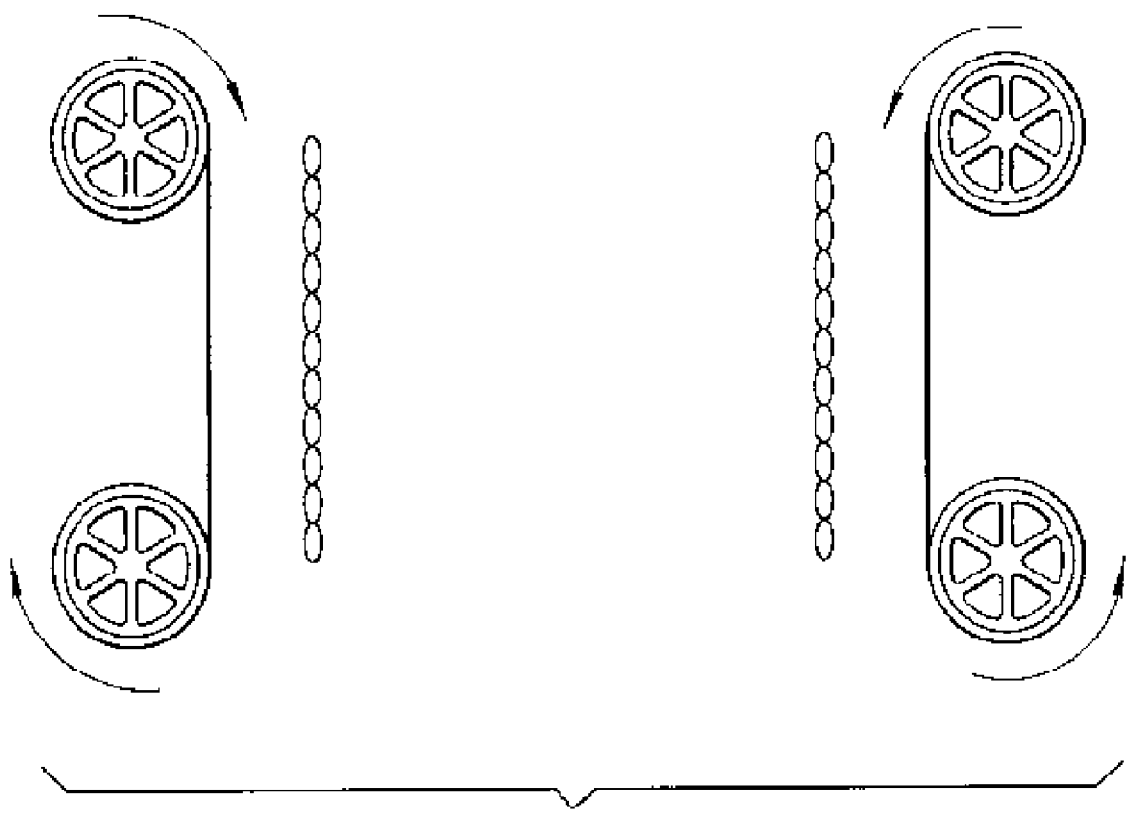
FIG. 7 is a schematic showing the standard method of image inversion.

The method of everting a pseudoscopic image is to reconstruct the 3-dimensional image in the usual manner and then to re-photograph the reconstruction with a second camera. The reconstruction of this second film will produce a pseudoscopic image of the 3-dimensional image which was photographed. Since this image was originally pseudoscopic, the pseudoscopic reconstruction of this image would be orthoscopic. This method of image eversion is shown in FIG. 7. This technique has two major dosadvantages. First, an intermediate processing step is required in which a second film must be made; second, there is an inherent resolution loss of $\sqrt{2}$ when going from one film to the other.

Figure 8:
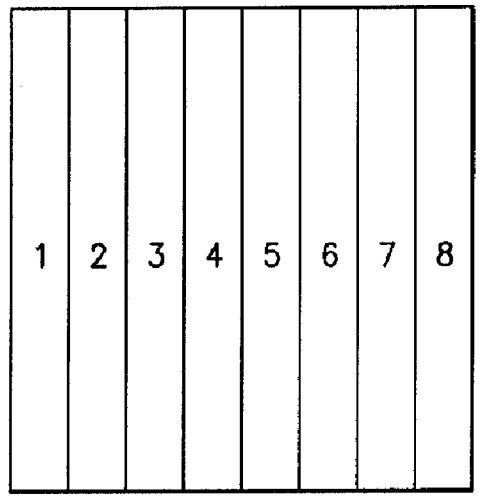
FIG. 8 shows how image inversion can be accomplished without loss of resolution.
Figure 8:
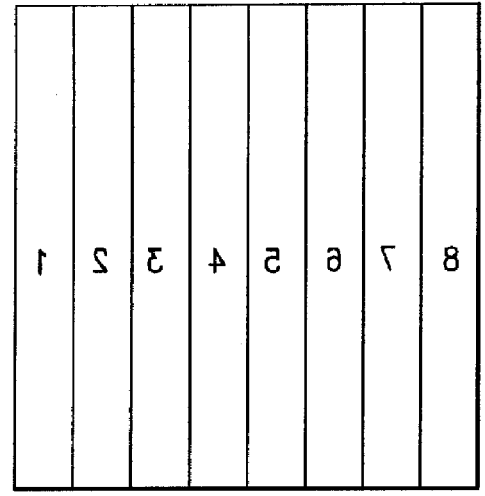
Figure 8:
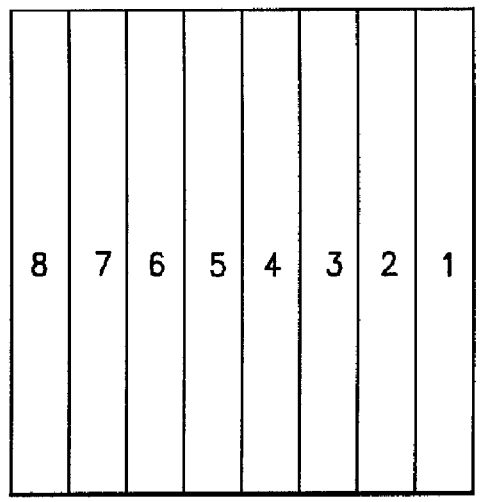

There is another basic method of producing orthoscopic images from pseudoscopic images which will not incur this resolution loss. This method was described in the Claimed Priority Patents and Applications. The basic principle is quite simple. Referring to FIG. 8, if the film format shown in FIG. 8($a$) produces a pseudoscopic image, then it can be shown by an optical analysis of what a second film record would look like were the 3-dimensional image from FIG. 8($a$) to be photographed, that the film format of FIG. 8($b$) would produce an orthoscopic mirror image of the pseudoscopic 3-dimensional image produced by the format of FIG. 8($a$), while format of FIG. 8($c$) will produce a correct orthoscopic image.

The method for image eversion discussed here concerns itself only with its performance in the projector. Any intermediate processing where another film must be prepared is discussed in the Claimed Priority Patents and Applications only. The proposed method is to perform this eversion during unmultiplexing when a holographic imaging device is used (refer to FIG. 3). In this case, each element would be mirror image inverted, but the order of the elements could be kept in-tact holographically. In fact, the elements can be holographically arranged in any order that is desired.

Accordingly, any of the holographic optical elements described above can be fabricated in a manner so that when an integral photographic image is processed by it, the 3-dimensional image projected therefrom will be orthoscopic. This is done by optically reversing each elemental image of the integral photograph separately as shown in FIG. 8. When preparing the elemental parts of the holographic imaging device, the optics for elemental image eversion must be included.

Therefore, the schematic shown in FIG. 4, either including or not including the second matrix lens array 19, represents the ideal optical system for projection and magnification of integral photographs. Not only do the holograms cause projection and magnification of the integral photographs on the screen, but they also unmultiplex the unmagnified integral photograph and perform the appropriate image eversion required for ultimate viewing of the resultant 3-dimensional scene.

Figure 9:
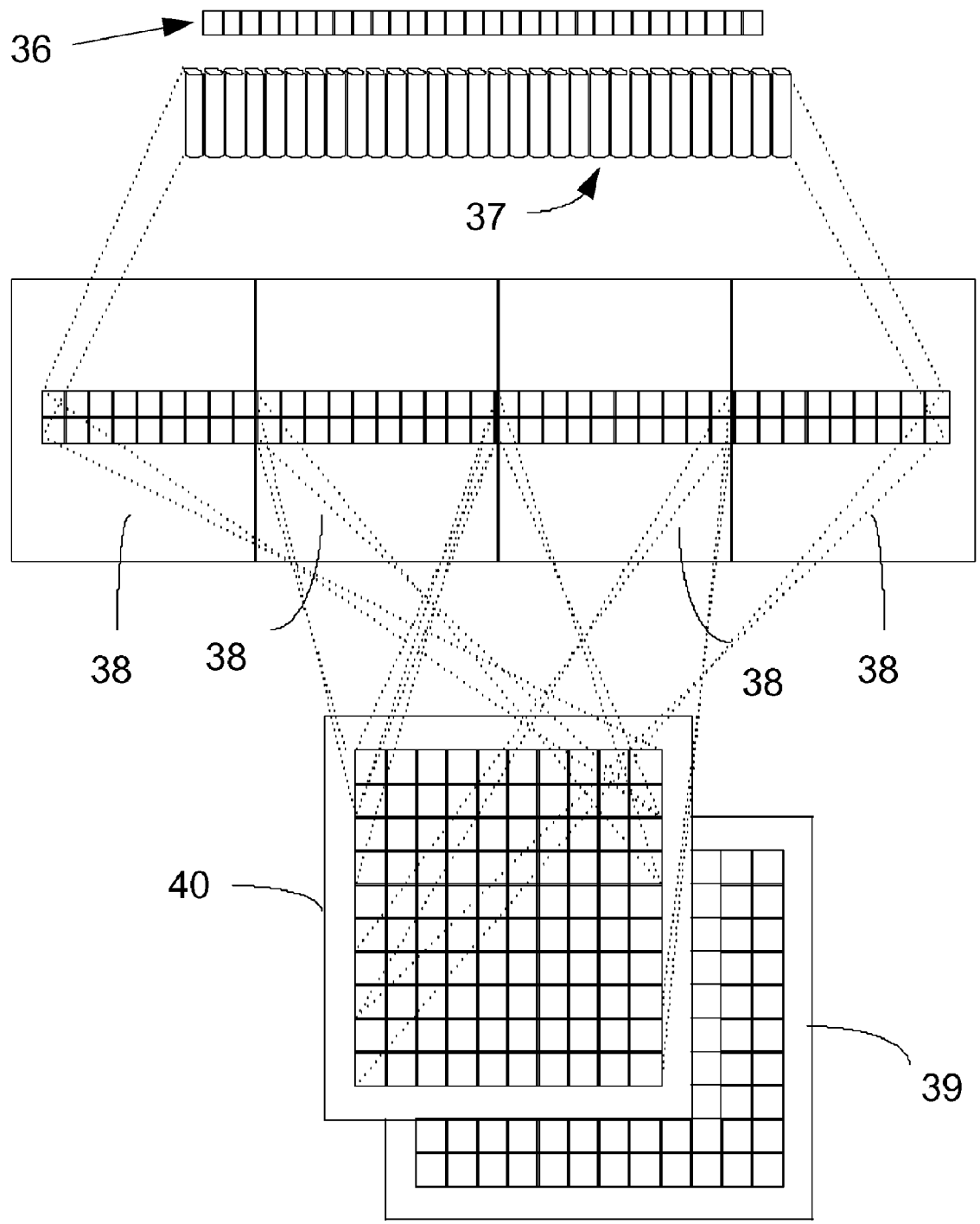
FIG. 9 is a schematic of holographic multiplexing optics.
Figure 10:
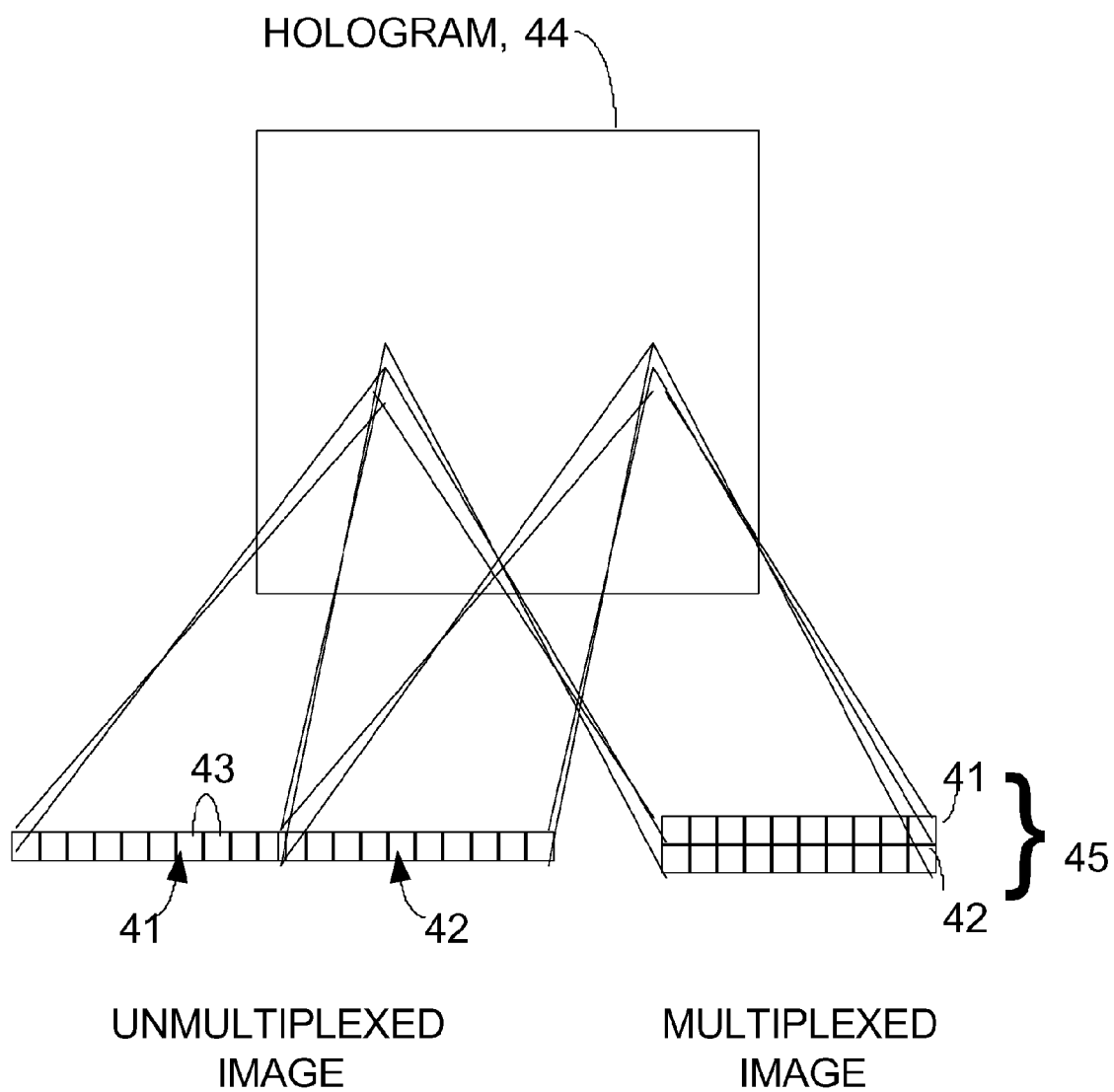
FIG. 10 is a schematic showing the method of holographic multiplexing using the optics shown in FIG. 9.

Now turning to the issue of image multiplexing, the Claimed Priority Patents and Applications describe one embodiment of the camera design that uses holographic optics to accomplish the image dissection and multiplexing. This is shown conceptually in FIG. 9. In this case, reflection holograms are used because of their high diffraction efficiency (95-100%), although the process would work conceptually even with transmission holograms. (The diagrams, however, are shown using reflection holograms.) This process involves the transfer of images from one holographic plane to another plane with 1:1 magnification. (Several methods exist to provide aberration free magnification using holography, should this be desirable.) In the figure, the image 36 is projected through the camera matrix lens array 37 or otherwise focused onto hologram plane 38 which, in turn, projects the appropriate multiplexed frame onto the film, 39, using intermediate holographic planes (shown symbolically as planes 40) if necessary. These intermediate planes serve the purpose of allowing the image to impinge onto the film from a far less severe angle, thereby decreasing the aberrations. But, these intermediate planes may not be necessary. FIG. 10 shows conceptually how such a holographic plane can be made. For clarity, multiplexing will be accomplished, in this figure, for only two rows. The image on the left with two rows, 41 and 42, arranged horizontally is projected using lens 43 onto hologram 44. This projected image acts as a reference beam for the hologram, therefore, reconstructing an object beam which focuses an image in space 45, consisting of rows 41 and 42 arranged vertically. The hologram is prepared by using two moving apertures. The hologram is prepared using each elemental image of the primary integral photograph as the reference beam and the corresponding elemental image of the secondary integral photograph as the object beam and by exposing the photographic plate with both reference and object beams on opposite sides. The apertures then move to each pair of elemental images in turn, with the hologram being re-exposed each time. It could be desirable to use a third moving aperture and fourth moving aperture positioned adjacent to but on opposite sides of the photographic plate. Furthermore, it could be desirable to use coherent light from a short burst laser to expose the photographic plate so as to reduce noise.

The preferred embodiment of the screen is an array of cylindrical zone plates with associated color filtration. Zone plates can be produced holographically. However, instead of being produced as transmission holograms, they are produced as reflection holograms. Reflection holograms are commonly manufactured by a process called Bragg-Angle Holography. In this instance, instead of the diffraction pattern being formed on the surface of the photographic emulsion which makes up the hologram, the diffraction pattern is formed in the volume of the emulsion itself. Such a holographic zone plate would have the following advantages:

(1) Since it is formed as a reflection hologram, this type of screen is applicable to front projection, the technique now in use in most theaters.

(2) A reflection holographic screen accepts white light emanating from a point source and reflects it into the audience at the wavelength with which the hologram was initially made. Since the zone plate screen consists of a mosaic of alternating zone plates, each one produced as a hologram by laser light having a different wavelength, it becomes obvious that a holographic screen of this type already has its own color plate "built-in". Separate color filters are not required.

The screen is a Bragg Angle Reflection Hologram, which when illuminated from the front with a beam of white light having a spherical wavefront, the reconstruction will be a series of thin vertical lines, each line a different color, the colors alternating between red, green and blue, each line projected in front of the screen a distance f, and the vertical lines will be arranged horizontally across the width of the screen. A Bragg Angle Hologram is really a diffraction grating whose diffracting elements are distributed throughout the volume of the emulsion. A reconstruction can only be obtained by a reference beam of the same wavelength as was used to make the hologram. For this wavelength, the reconstruction efficiency is extremely high. If a white light reference beam should be used, only the appropriate color component will be selected to perform the reconstruction.

Figure 11A:
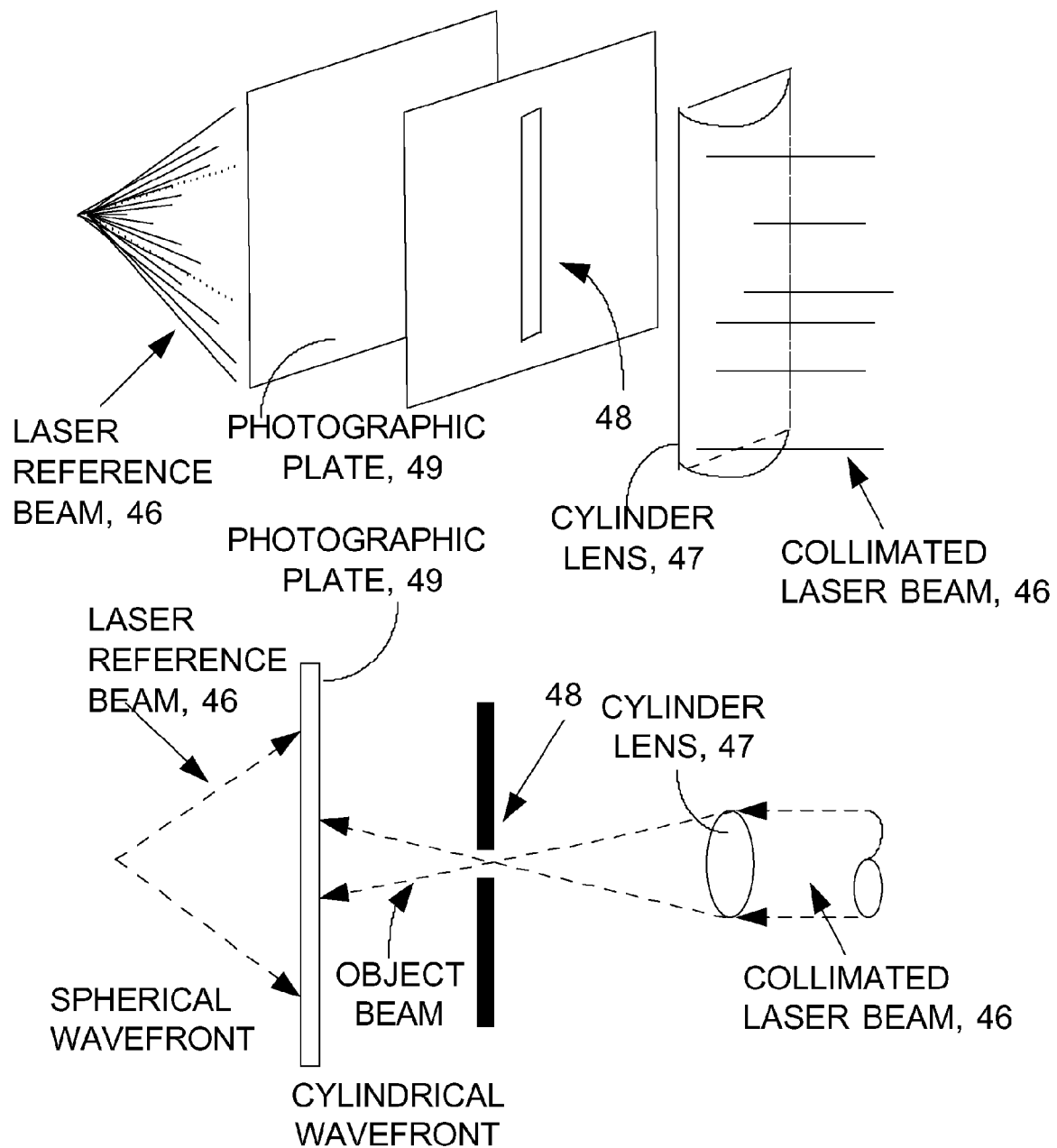
FIG. 11 shows the process for formation or manufacture of the front projection holographic screen.
Figure 11B:
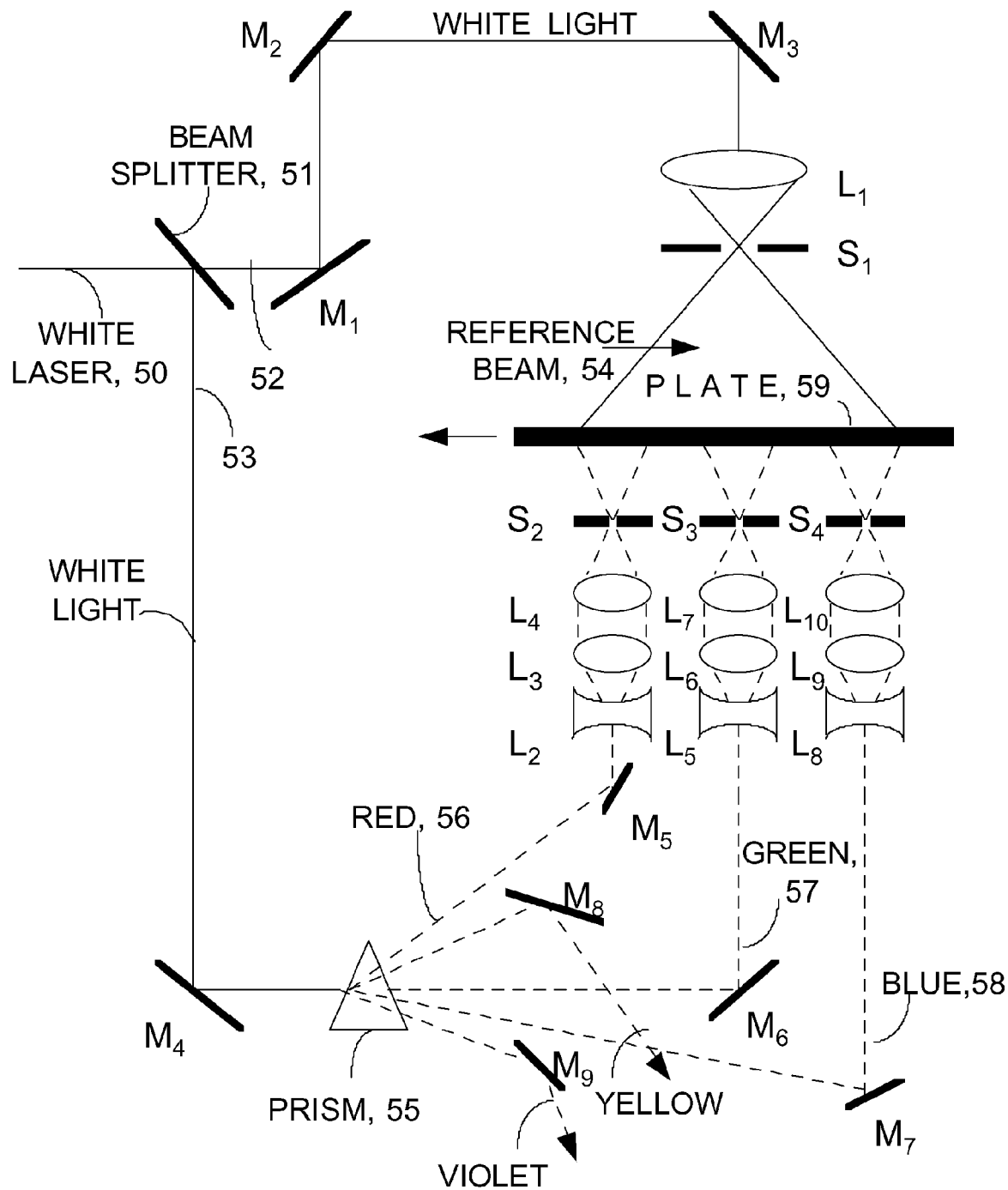
Figure 12:
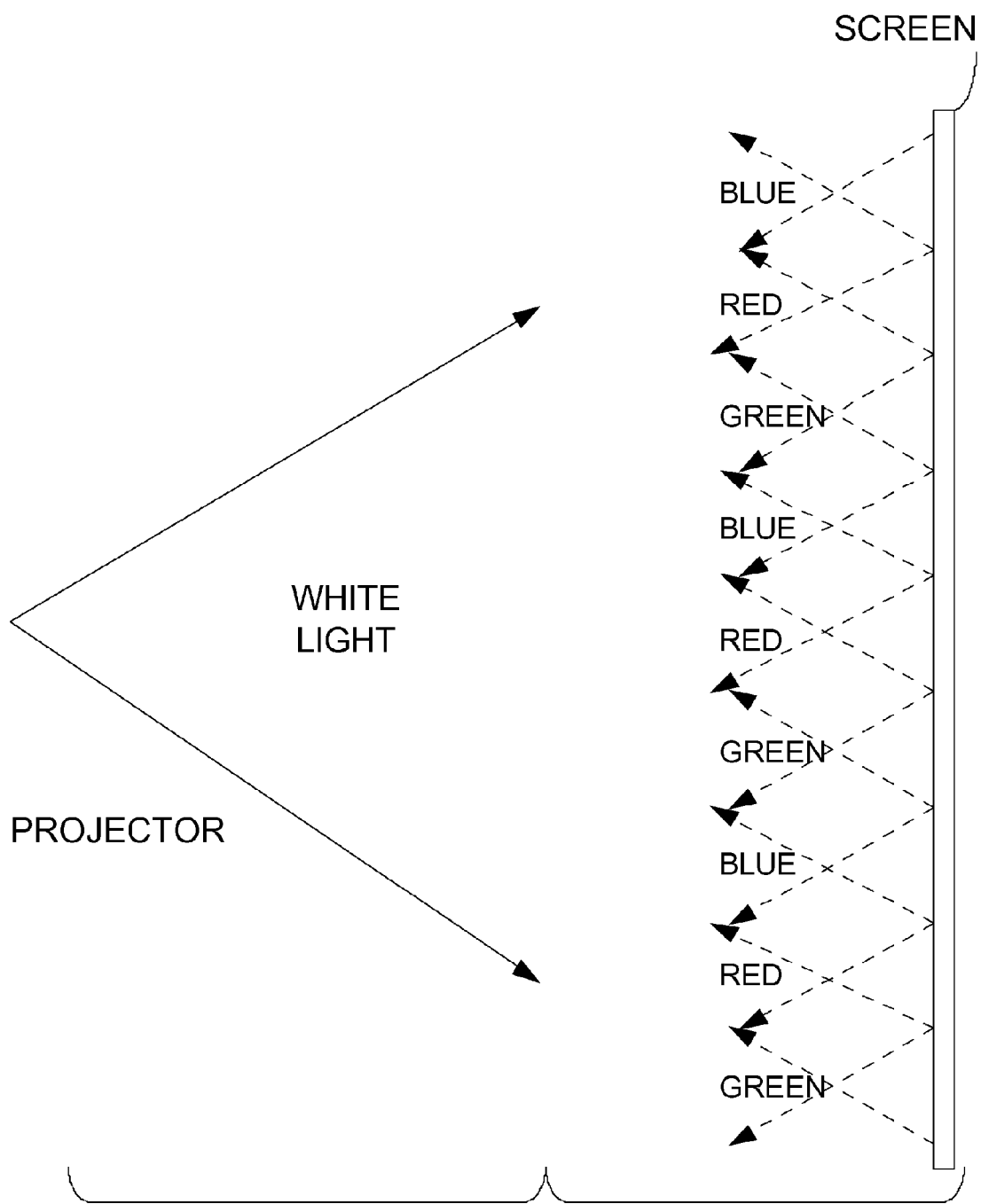
FIG. 12 shows the method of reconstruction from projection onto the front projection holographic screen.

FIG. 11(a) shows the fabrication of a reflection hologram with monochromatic light. The reference beam is a spherical wavefront and the reconstruction is a real image of a single vertical line projected in front of the hologram. The object beam is created by passing a laser beam 46 through a cylindrical lens 47 which focuses through a slit 48 positioned at a distance f from the photographic plate 49. The reference beam is produced as a spherical wavefront from the same laser 46, and is made to impinge upon the opposite side of the photographic plate 49. This operation can be performed separately for each wavelength needed, or the hologram can be fabricated as shown in FIG. 11(b). A white light, or multi-wavelength laser 50, such as a krypton laser, is used. The complete beam having all color components is used as the reference beam 54. The laser beam is split in two using a beam splitter 51 into two components 52 and 53. Beam 52 ultimately becomes the reference beam 54 after passing the optical components (mirrors $M_1$, $M_2$ and $M_3$, and concave lens $L_1$ and circular aperture $S_1$). Beam 53 ultimately becomes the object beams. First, the color components are separated by a prism 55. The unwanted wavelength components are removed by mirrors $M_0$ and $M_3$ leaving only the three red 56, green 57 and blue 58 object beams to be used to create the hologram. (Of course, colors other than red, green and blue can be used as long as they are complementary colors which are used to form white.) Thus far only three zone plates have been created on the photographic plate 59. The photographic plate 59 is then moved, and a new section is exposed in exactly the same manner. The method of reconstruction is shown in FIG. 12. A white light reference beam with a spherical wavefront is used to reconstruct alternating red, green and blue cylindrical wavefronts. Should the reference beam emanate from a projector in the rear of the theater with the image of an integral photograph impressed on the beam such that the image of the integral photograph is focused onto the screen, then a 3-dimensional image will be reconstructed from the integral photograph. In this case, a color filter is not required, as the image will be properly broken down into the appropriate color pattern, and black & white film must be used.

The screen need not be prepared as an extremely large hologram, as this would be impractical. Even in a very small theater, the screen size might be 20 feet wide×10 feet high. The mechanics of producing a hologram that large is formidable. Instead, smaller rectangular shaped tiles can be manufactured. These tiles can then be assembled to produce a screen of any size. However, the tiles would only be identical were the projector to be located at infinity. This would not be the case. Therefore, based upon the position of the holographic tile in the screen, the angle that the reference beam makes with the tile would differ. Therefore, for each tile, the reference beam has a spherical wavefront that appears to have been generated at a desired projection distance and the object beam has a cylindrical wavefront that appears to have been generated at a distance calculated as the focal length for that wavelength.

Now we turn to the fabrication of high quality holographic imaging optics. With any ordinary optical system, when projecting a 2-dimensional image, the projected image is normally degraded with respect to the original image. This is true even at 1:1 magnification. The reason for this is that most optical systems exhibit inherent aberration and distortion. However, it is often required that a projected image have extremely high quality with minimum aberration and distortion. To accomplish this, special high quality optical systems must be used. Often such optics do not exist, and must be specially designed and fabricated. Obtaining such optics can be very expensive.

The Claimed Priority Patents and Applications disclose the requirement that projected images must be of extremely high quality, particularly during intermediate processing and intermediate projection. A special case of this intermediate projection is when it is performed at no magnification. This is very useful in certain of the final projection systems discussed in the Claimed Priority Patents and Applications. What is required is that an image be transferred from one image plane to another at 1:1 magnification with the resolution preserved, i.e., the total information must be transferred from one image to the other. Such an imaging system is typically used for a microprojector and semiconductor circuits. One such system was designed by PERKIN-ELMER several years ago. This optical system uses mirrors instead of lenses. It covers a field of two-inches. Resolution was one-micron or 500 line pairs/mm. Of course such an optical system could be constructed using lenses, but it would be more complex and very much more expensive.

Figure 13:
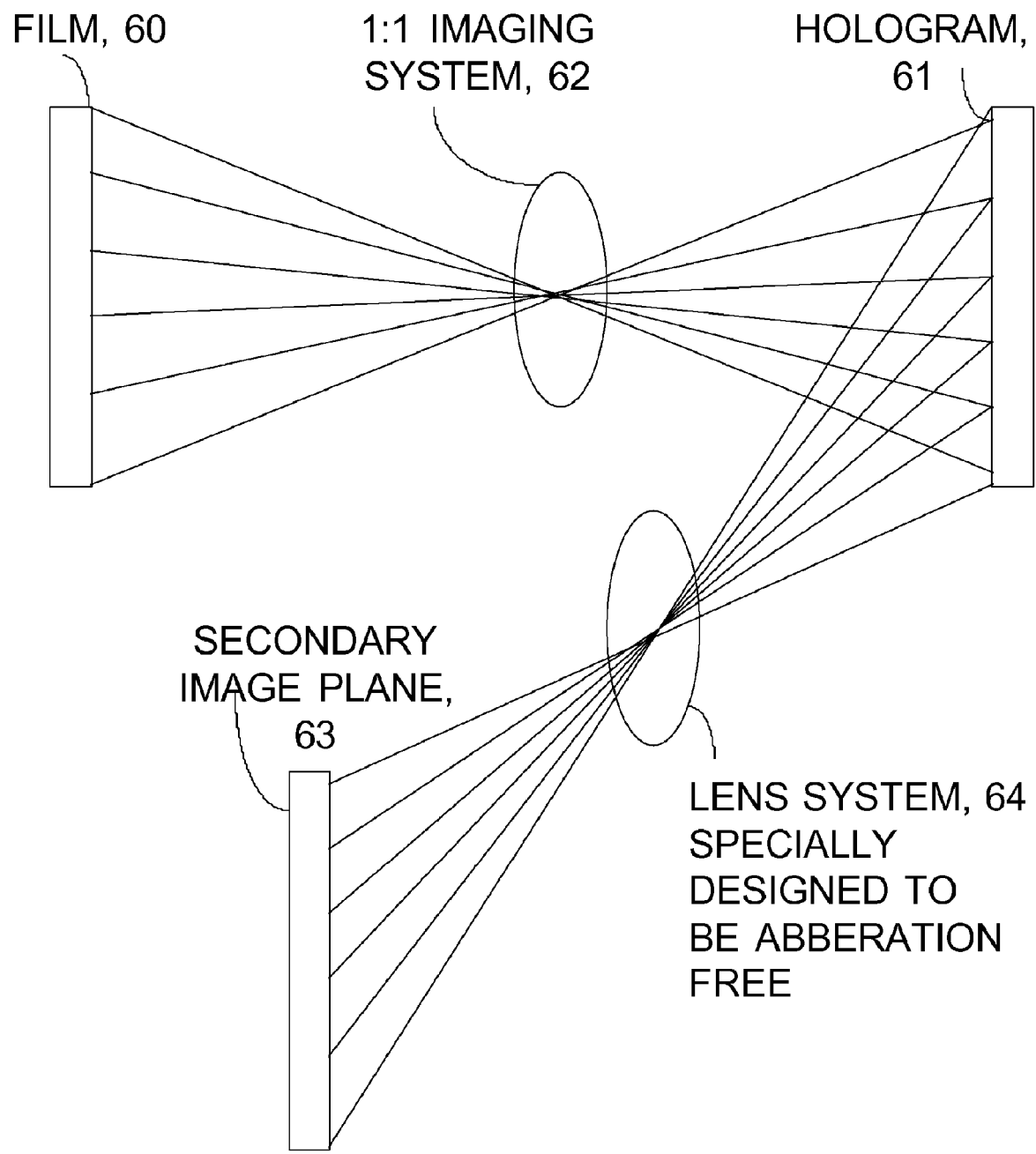
FIG. 13 is a schematic of a primary holographic imaging system using high quality optics.

Holographic optics can be used to accomplish this type of high quality image transfer or projection. Reflection holography should definitely be used since the diffraction efficiency is much higher than for transmission holography. FIG. 13 shows how a non-permanent image can be projected using the principle of primary holographic projection. The 2-dimensional image from the film 60 is projected onto a reflection hologram 61 using a 1:1 imaging optical system 62. The image is then focused onto a secondary image plane 63. In this case, a specially designed aberration free lens 64 is used in conjunction with the hologram for projection. Since this expensive lens must be used during normal projection of the film, this method is not very practical. However, since a hologram is an imaging device itself, the hologram can be used as a high quality lens.

Figure 14:
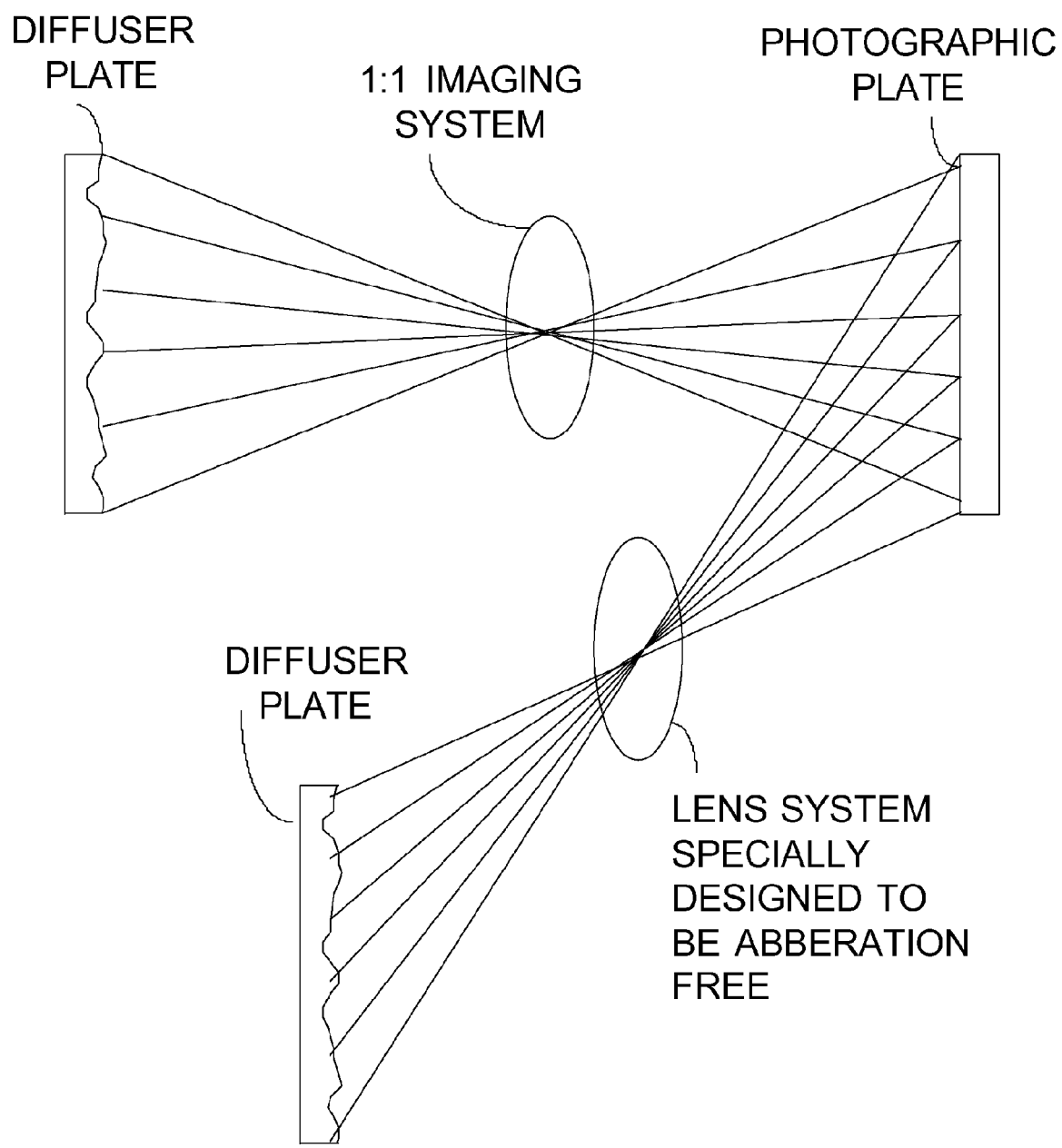
FIG. 14 shows the method of fabricating a high quality holographic imaging system.

FIG. 14 shows one method of fabricating such a hologram. The film 60 of FIG. 13 is replaced by a translucent diffusing screen, and another translucent diffusing screen is made to coincide with the secondary image plane 63 of FIG. 13. In this case the photographic plate is totally reflective on the side opposite from the emulsion. Both diffusing screens are transilluminated by the same laser and the hologram is exposed. The reference beam passes through the standard lens while the object beam passes through the high quality lens. Of course, this can also be accomplished by eliminating the reflective coating on the reverse side of the photographic plate by causing the object beam to impinge upon the reverse side of the plate. However, the efficiency of the reflective method is considerably higher.

Figure 15:
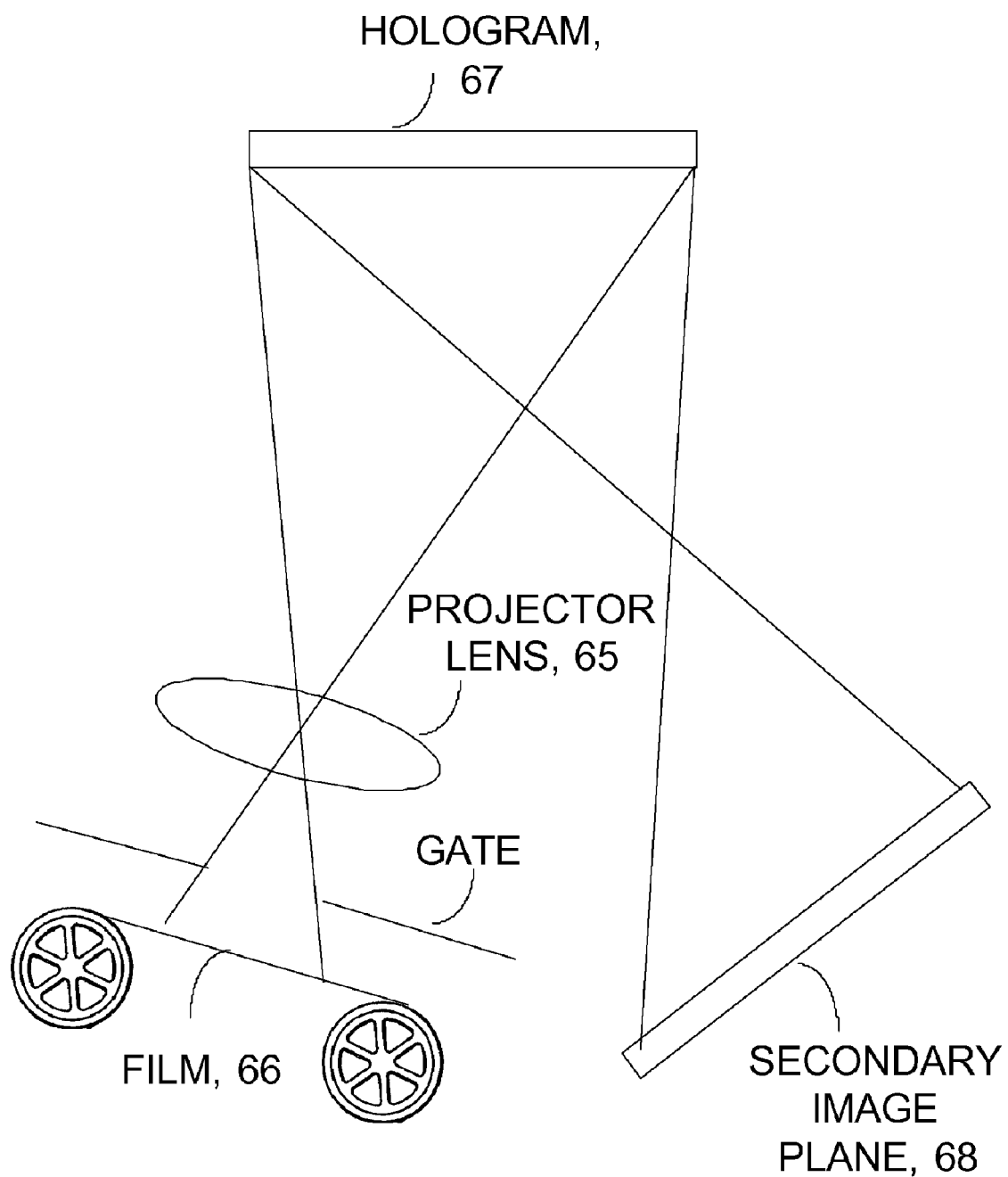
FIG. 15 shows how the holographic imaging system of produced using the method of FIG. 14 can be used for projection of high quality images.

FIG. 15 illustrates how such a hologram would be used. A standard projection lens 65 images the film frame 66 onto the specially prepared hologram 67, which, in turn, acts as a reflecting lens to image the film frame onto the secondary image plane 68 at some greater magnification. This hologram is a high quality Leith Hologram, and is indicated operating as a reflection hologram because the diffraction efficiency is much higher for reflection than for transmission.

Figure 16:
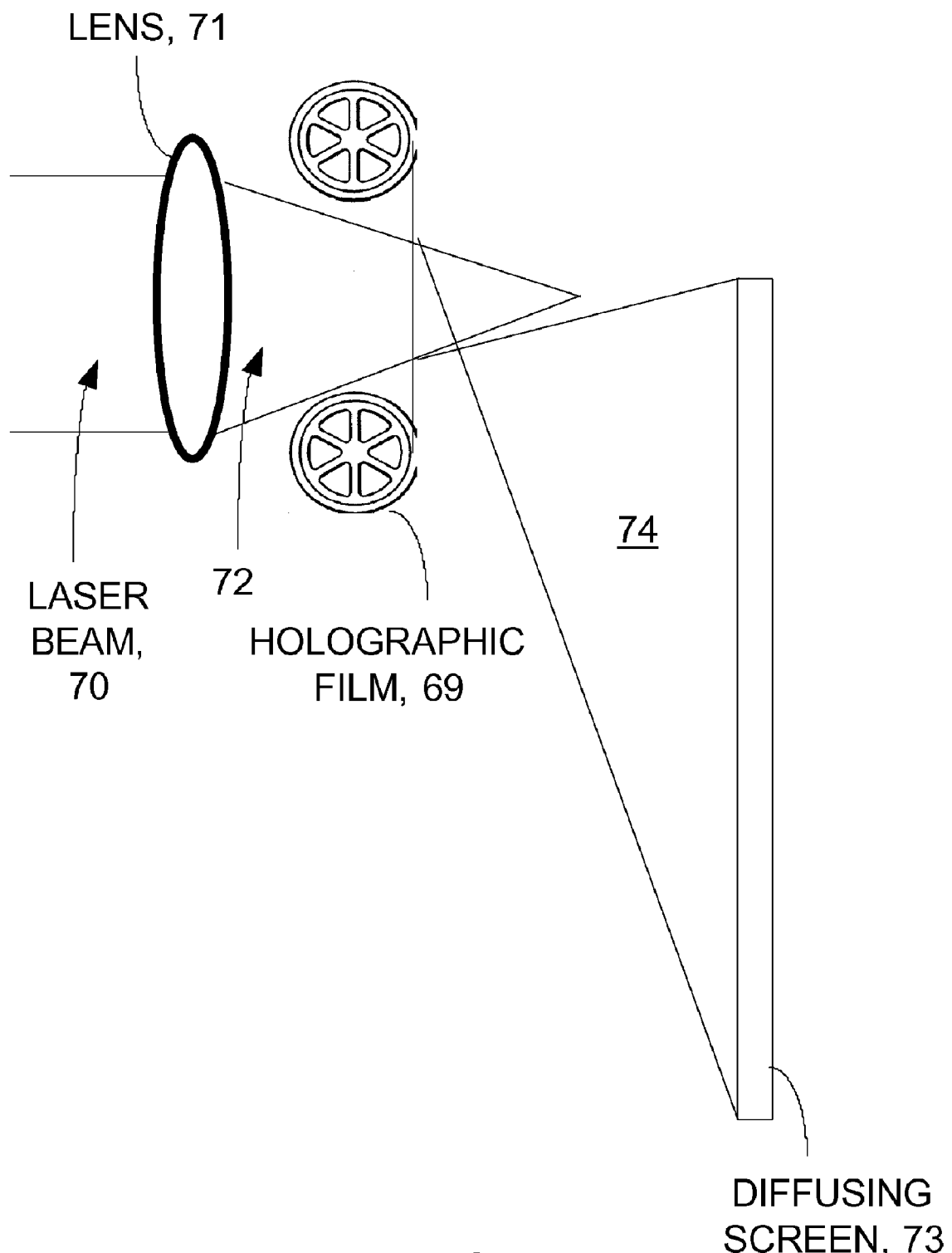
FIG. 16 shows the use of a hologram whose reconstructed real image is a 2-dimensional integral photograph.

The discussion now proceeds to holography of a 2-dimensional integral photographic film. In this method a holographic movie film is used. However, the projected real image of the hologram is a 2-dimensional image which is projected onto a diffusing screen (or imaginary image plane). This image is the integral photograph to be projected. This process is illustrated in FIG. 16. Since the initial photograph that will be taken by the camera is an integral photograph, a hologram can be taken of each frame of the integral photographic film, and the reconstructed image will, therefore, be the integral photograph. Referring to FIG. 16, to construct the hologram 69, a laser beam 70 passing through a standard projection lens 71 serves as the reference beam. The integral photographic frame is projected using the same laser beam onto diffusing screen 73 which produces the object beam 74. The combination of reference beam 72 and object beam 74 produces the hologram. To reverse the process for projection, light impinges upon projection lens 71 and then upon the holographic film frame 69. This reconstructs object beam 74 that produces a focused image of the integral photograph on diffusing screen 73. This method contrasts with that of direct holography where holograms are taken of the scene directly.

In 1968, Dr. D. J. DeBitetto of Phillips Laboratories, Briarcliff Manor, N.Y., published several articles concerning holographic 3-dimensional movies with constant velocity film transport. In these articles, he described holograms produced which allowed bandwidth reduction by elimination of vertical parallax. This was accomplished by making the 3-dimensional holograms on a film strip using a horizontal slit as an aperture. The frames were formed by advancing the film each time by the width of the slit. Each frame was animated. After development, the film was illuminated as any hologram would be, and the filmstrip was moved at constant velocity. I have seen Dr. DeBitetto's holographic movies, and they are the best attempts to-date in the field of motion picture holography. The 3-dimensional pictures are of extremely high quality. However, vertical parallax was absent.

Figure 17:
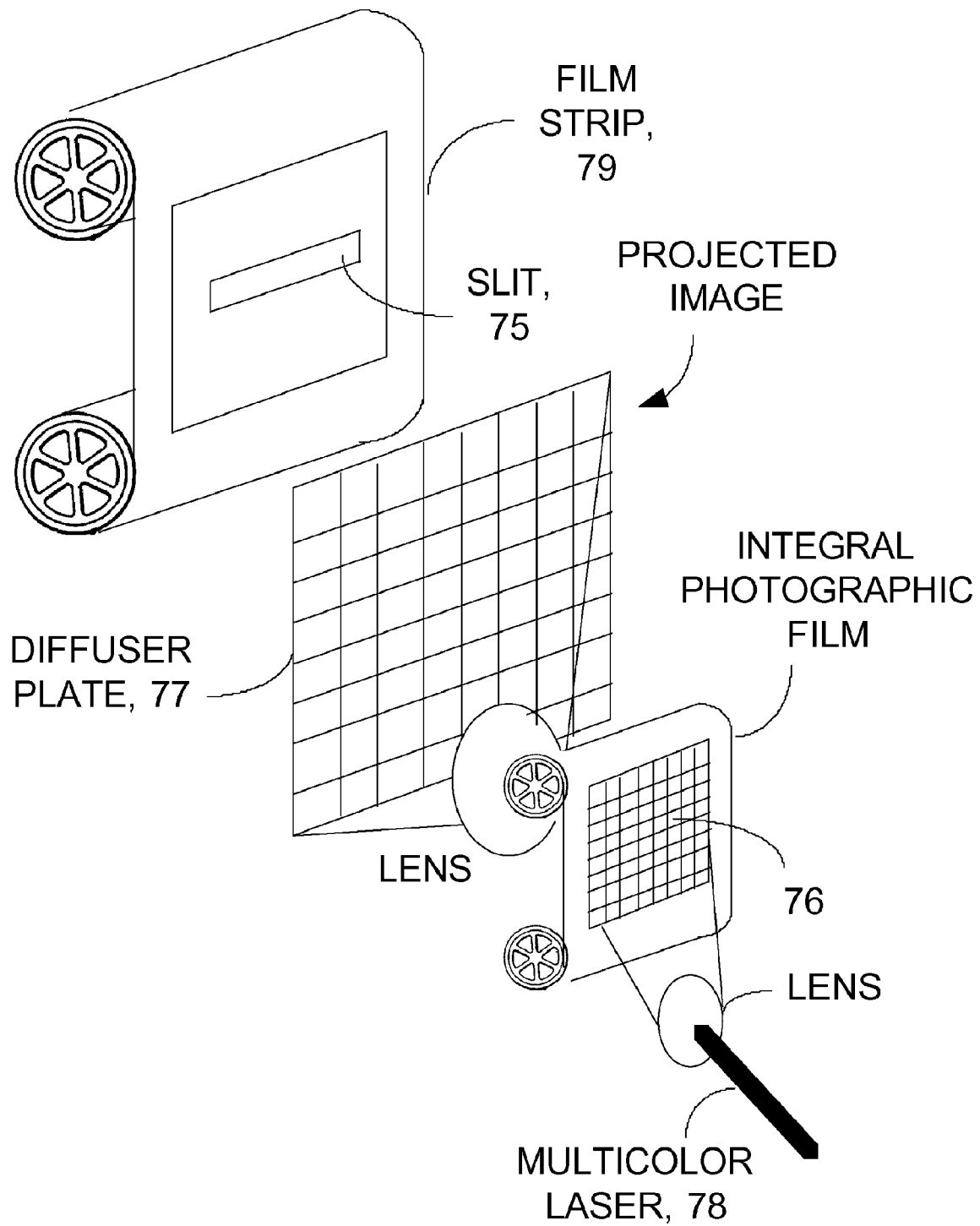
FIG. 17 shows a method of preparing strip holograms.

The same technique can be used in our projector. It can be used with direct holography as Dr. DeBitetto did or it can be used with holograms of integral photographs as shown in FIG. 17. In this figure, and by this technique, a horizontal strip hologram 75 is taken of each integral photographic frame 76 (in any format, multiplexed or unmultiplexed), and the holographic film strip is advanced for each frame. This is done by projecting the integral photographic frame 76 onto a diffuser plate 77 using coherent illumination from a multicolored laser 78 (e.g., a white light krypton laser). This becomes the object beam necessary to produce the hologram. It is possible to take several strip holograms of the same frame. Afterwards, the holographic film 79 is played back in the projector at constant velocity.

Dr. DeBitetto takes his holograms as strip holograms in that both the holography and projection must be performed with the slit aperture. This requires the holography of a very large number of small strip frames, the animation of each frame showing only slight or minuscule motion with respect to the previous frame. This is contrasted with the method of taking holographic movies where each frame has a reasonable size both in height and in width (as would be expected in a standard format motion picture film). Obviously, Dr. DeBitetto's technique has the disadvantage of requiring an extremely large number of frames, thus making the process very arduous. However, this patent application submits that the frames be prepared in the standard motion picture format (as opposed to horizontal strip holograms), and that the frame be projected with a horizontal slit aperture. The film is used in the same way as in Dr. DeBitetto's process, and is projected at constant velocity. The image projected from the hologram onto the screen will only change in vertical parallax as the frame moves by the aperture. However if the film format used is that previously described for holography of the original 2-dimensional integral photographic film, then the vertical parallax does not change as the frame moves by, because the projected image is 2-dimensional and has no vertical (nor horizontal) parallax. The image only changes, therefore, when a new frame comes into view. Therefore, the height of the frame required for the holographic film will depend upon the film velocity and the frame rate. This represents the preferred embodiment for the holographic projector.

Constant velocity is a tremendous advantage for projection of 3-dimensional movies. Since film registration must be held to extremely tight tolerances, not having to stop the film for each frame would provide much needed stability, and film registration would be far simpler. Without this constant velocity transport, each frame would have to be registered with the three-point registration system as described in the Claimed Priority Patents and Applications. Furthermore, constant velocity film transport reduces the probability of film breakage.

The discussion now turns to intermediate processing of the film. In the previous discussions of the formation of orthoscopic images from pseudoscopic images, image eversion was accomplished during the projection stage. It is considered more desirable to accomplish this operation during the projection stage because it can be done without the inherent loss in resolution (a factor of $\sqrt{2}$) attached to a process in which a new integral photograph or hologram must be copied from the 3-dimensional projected image. Should it be desired to make a film to be presented to motion picture theaters, which, in turn, when projected, would produce orthoscopic images, then the best method of making such films from the original would be by the projection techniques previously discussed. These projection techniques can be used for film copying as well as for projection onto a screen. However, for the sake of completeness of this application, the methods for image eversion, by making a new integral photograph or hologram from the original reconstructed 3-dimensional pseudoscopic image, will be presented.

Figure 18:
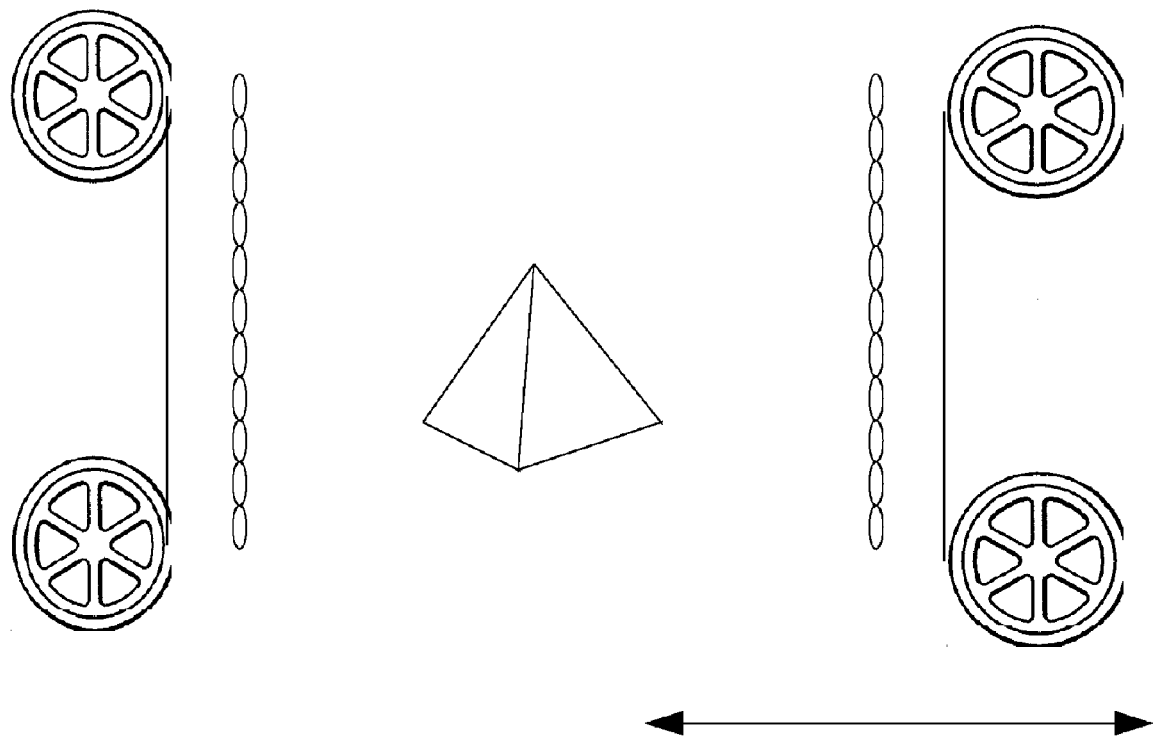
FIG. 18 shows image eversion from pseudoscopy to orthoscopy using integral photography.
Figure 19:
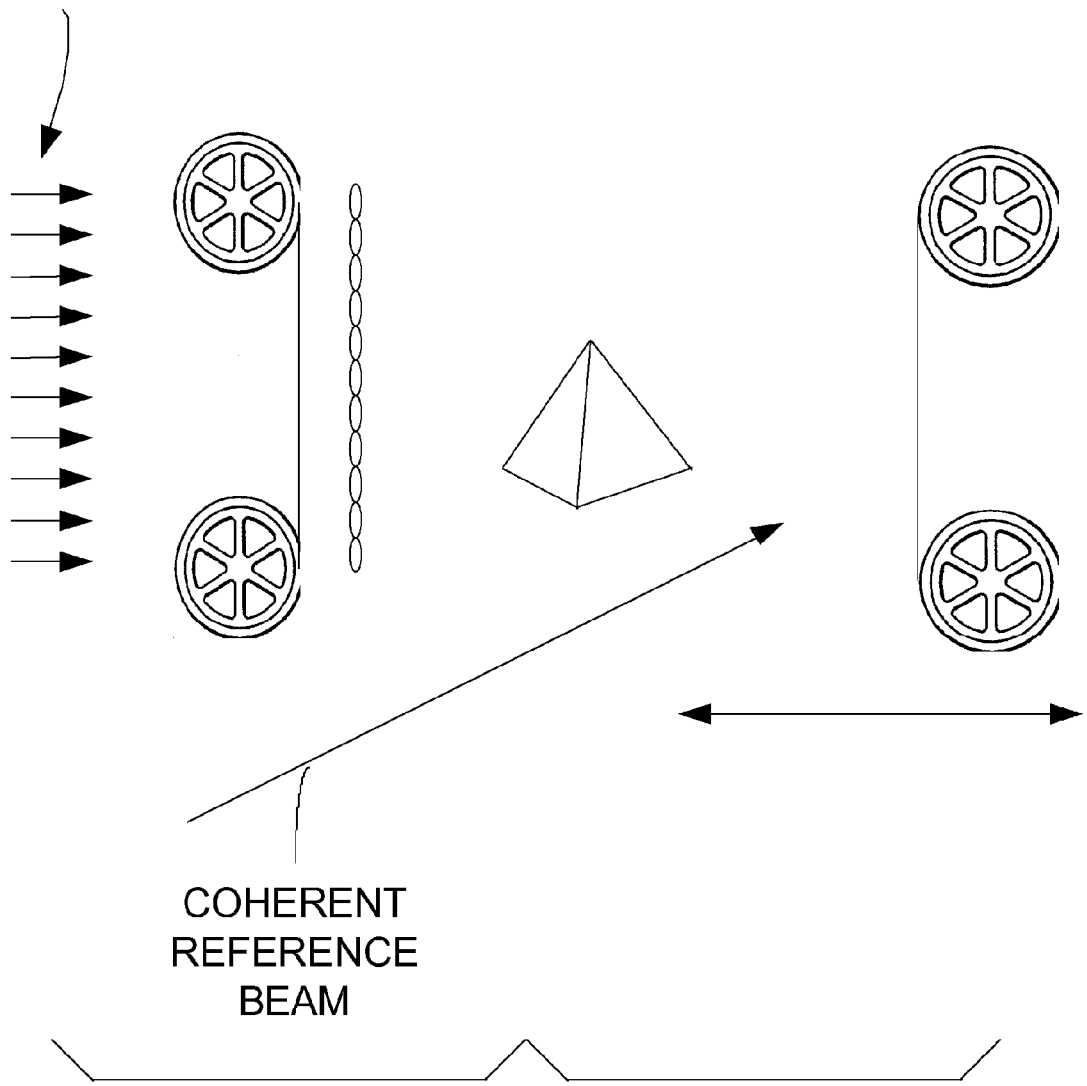
FIG. 19 shows image eversion from pseudoscopy to orthoscopy using holography and integral photography.
Figure 20:
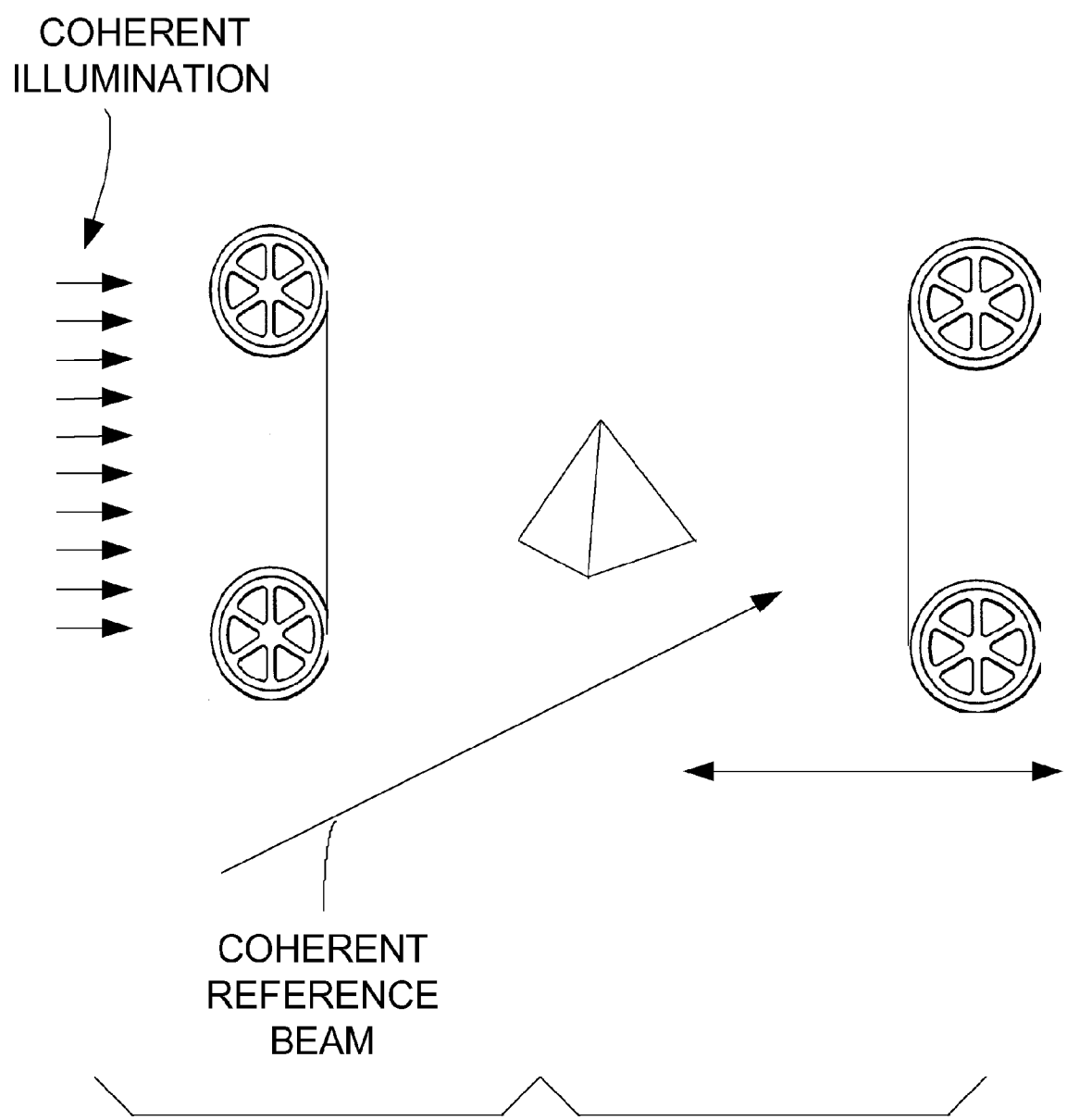
FIG. 20 shows image eversion from pseudoscopy to orthoscopy using holography.

FIGS. 18, 19 and 20 show how to perform this eversion. FIG. 18 illustrates converting from one integral photograph to another; FIG. 19, from an integral photograph to a hologram; and FIG. 20, from one hologram to another. Note that, in each of these setups the film upon which the new integral photograph or hologram is to be produced may be positioned anywhere with respect to the pseudoscopic image. What is important is that the original reconstructed wavefronts be used to form the new record and not the image. The method of inverting a pseudoscopic image is to reconstruct the 3-dimensional image in the usual manner and then to re-photograph the reconstruction with a second camera. The reconstruction of this second film will produce a pseudoscopic image of the 3-dimensional image which was photographed. Since, this image was originally pseudoscopic, the pseudoscopic reconstruction of this image would be orthoscopic. This method of image eversion is shown in FIG. 7. This technique has two major disadvantages. First, an intermediate processing step is required in which a second film must be made; second, there is an inherent resolution loss of $\sqrt{2}$ when going from one film to the other.

What is claimed is:

1. A method for making a holographic output array, to be used in a system for recording and projecting three-dimensional images, wherein,
    said holographic output array comprises a plurality of holographic optical focusing elements
    said holographic output array reconstructs the projected three-dimensional image;
    said system utilizes an input optical array and the holographic output array to magnify said three-dimensional images;
    the input optical array contains a plurality of image focusing elements therein;
    the holographic output array contains a plurality of image focusing elements therein of the same number and geometrically similar arrangement as the input optical array;
    all of the image focusing elements of both the input optical array and holographic output array have centers that are separated by distances;
    all of the image focusing elements of both the input optical array and holographic output array have focal lengths;
    the distances between the centers of the focusing elements of the holographic output array are the same multiple of the distances between the corresponding focusing elements of the input optical array, respectively, said multiple being equal to the magnification factor;
    the focal lengths of the focusing elements of the holographic output array are the same multiple of the focal lengths of the corresponding focusing elements of the input optical array, respectively; and,
    said three-dimensional images are magnified uniformly in all dimensions by a magnification factor,
    said method comprising:
        a) producing a recording reference beam of coherent light from a coherent light source;
        b) producing an object beam of coherent light from the same coherent light source;
        c) producing at least one focusing element of said holographic output array by using the reference beam and object beam to create a holographic optical focusing element; and,
        d) repeating the above steps until the desired number of holographic optical focusing elements comprising the holographic output array are produced;
    wherein:
        the holographic output array is prepared by exposing portions of a photographic plate incrementally until the entire array is produced;
        the portions of the photographic plate that were incrementally exposed are the focusing elements; and,
        each focusing element reconstructs a cylindrical wavefront.

2. The method of claim 1 wherein all of the reconstructed cylindrical wavefronts are parallel to each other.

3. The method of claim 2 wherein the holographic output array is produced as a hologram that functions as a front projection holographic screen for reconstructing magnified 3-dimensional images projected from unmagnified integral photographs or holograms.

4. The method of claim 3 all of the reconstructed cylindrical wavefronts focus to adjacent parallel lines of light located in front of the screen at the respective focal lengths of the cylindrical focusing elements.

5. The method of claim 4 wherein each of the adjacent parallel lines of light extends in length parallel to the entire screen in a first dimension.

6. The method of claim 5 wherein all of the adjacent lines of light form a series of lines that extends parallel to the entire screen in a second dimension.

7. The method of claim 4 wherein the adjacent parallel cylindrical lines of light are of a plurality of different monochromatic wavelengths.

8. The method of claim 7 wherein the adjacent parallel lines of light of the plurality of different monochromatic wavelengths repeat in a series wherein each adjacent line in the series is of a different wavelength.

9. The method of claim 8 wherein the number of monochromatic wavelengths of the plurality is at least three, and the wavelengths are chosen to be complementary so as to produce the appearance of white light.

10. The method of claim 9 further comprising:
a) optically splitting a first monochromatic laser beam into a reference beam and an object beam such that the reference beam has a spherical wavefront that appears to have been generated at a desired projection distance and the object beam has a cylindrical wavefront that appears to have been generated at a distance calculated as the focal length for that wavelength, required to magnify the three-dimensional images by the magnification factor;
b) exposing a transparent photographic plate having an emulsion with the reference beam and the object beam, wherein the reference beam exposes the entire plane of the photographic plate in all directions, and the object beam emanates from a line of light that extends across the entire photographic plate in the linear dimension at the focal length from the surface of the emulsion for that wavelength;
c) repeating steps (a) and (b) above for each succeeding monochromatic wavelength of the plurality so as to produce the series of lines of light spaced apart by a distance equal to the center distance required to magnify the three-dimensional images by the magnification factor; and,
d) repeating steps (a), (b), and (c) above so as to produce additional series across the entire photographic plate such that all of the lines of light are spaced apart by a distance equal to the center distance required to magnify the three-dimensional images by the magnification factor.

11. The method of claim 10 wherein the reference and object beams both impinge on the same side of the photographic plate.

12. The method of claim 10 wherein the reference and object beams both impinge on opposite sides of the photographic plate.

13. The method of claim 10 wherein the object beams are repositioned optically between successive exposures of the photographic plate so as to produce parallel lines.

14. The method of claim 10 wherein the photographic plate is repositioned mechanically between successive exposures of the photographic plate so as to produce parallel lines.

15. The method of claim 10 wherein the number of monochromatic wavelengths of the plurality is three, that are produced from monochromatic laser beams that can be roughly characterized as red, blue and green, respectively.

16. The method of claim 10 wherein the wavelengths of the plurality are all components of a single laser capable of producing white coherent laser light.

17. The method of claim 16 wherein the laser used is a krypton laser.

18. The method of claim 16 wherein the reference beam is a spherical wavefront comprised of several or all of the wavelengths produced by the white light laser.

* * * * *